US012267465B2

(12) United States Patent
Murakami

(10) Patent No.: US 12,267,465 B2
(45) Date of Patent: Apr. 1, 2025

(54) INSPECTION APPARATUS, CONTROL METHOD, AND PROGRAM PRODUCT FOR SETTING BATCH INSPECTION CONDITIONS BASED ON REGIONS SELECTED BY USER IN DISPLAYED REFERENCE IMAGE AND INSPECTION TYPE

(71) Applicant: CANON KABUSHIKI KAISHA, Tokyo (JP)

(72) Inventor: Katsuyuki Murakami, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 256 days.

(21) Appl. No.: 18/162,082

(22) Filed: Jan. 31, 2023

(65) Prior Publication Data

US 2023/0252618 A1 Aug. 10, 2023

(30) Foreign Application Priority Data

Feb. 10, 2022 (JP) ................................ 2022-019774

(51) Int. Cl.
*H04N 1/00* (2006.01)

(52) U.S. Cl.
CPC ..... *H04N 1/00039* (2013.01); *H04N 1/00005* (2013.01); *H04N 1/00079* (2013.01); *H04N 1/00087* (2013.01); *H04N 1/00334* (2013.01); *H04N 1/0044* (2013.01); *H04N 1/00482* (2013.01)

(58) Field of Classification Search
CPC ........... H04N 1/00005; H04N 1/00039; H04N 1/00079; H04N 1/00087; H04N 1/00334; H04N 1/0044; H04N 1/00482
See application file for complete search history.

(56) References Cited

U.S. PATENT DOCUMENTS

| | | | | |
|---|---|---|---|---|
| 2020/0019353 | A1 | 1/2020 | Okajima | |
| 2023/0067117 | A1* | 3/2023 | Nakamura | H04N 1/00076 |
| 2023/0177672 | A1* | 6/2023 | Nakamura | H04N 1/00039 382/103 |
| 2023/0273755 | A1* | 8/2023 | Muraishi | H04N 1/00363 358/1.15 |
| 2023/0306586 | A1* | 9/2023 | Tanaka | G06F 3/1256 |
| 2024/0037730 | A1* | 2/2024 | Kasahara | G06T 7/001 |
| 2024/0320819 | A1* | 9/2024 | Nakamura | H04N 1/00015 |
| 2024/0323291 | A1* | 9/2024 | Ikeda | H04N 1/00816 |
| 2024/0380850 | A1* | 11/2024 | Goto | H04N 1/00005 |

FOREIGN PATENT DOCUMENTS

| | | |
|---|---|---|
| JP | 2020-006603 A | 1/2020 |

* cited by examiner

*Primary Examiner* — Scott A Rogers
(74) *Attorney, Agent, or Firm* — Venable LLP

(57) ABSTRACT

An inspection apparatus that reads an image formed on a printed material to generate a reference image of an inspection target, and specifies each region including an object in the reference image, and displays the regions such that the regions are selectable. Also, the inspection apparatus batch-sets inspection conditions for a plurality of regions selected by the user via the displayed reference image. Further, the inspection apparatus disables batch setting of an inspection condition in a case where a plurality of regions selected by the user include different regions that include objects of different inspection types. On the other hand, in a case where a plurality of regions selected by the user do not include such different regions, the inspection apparatus enables batch setting of an inspection condition.

20 Claims, 18 Drawing Sheets

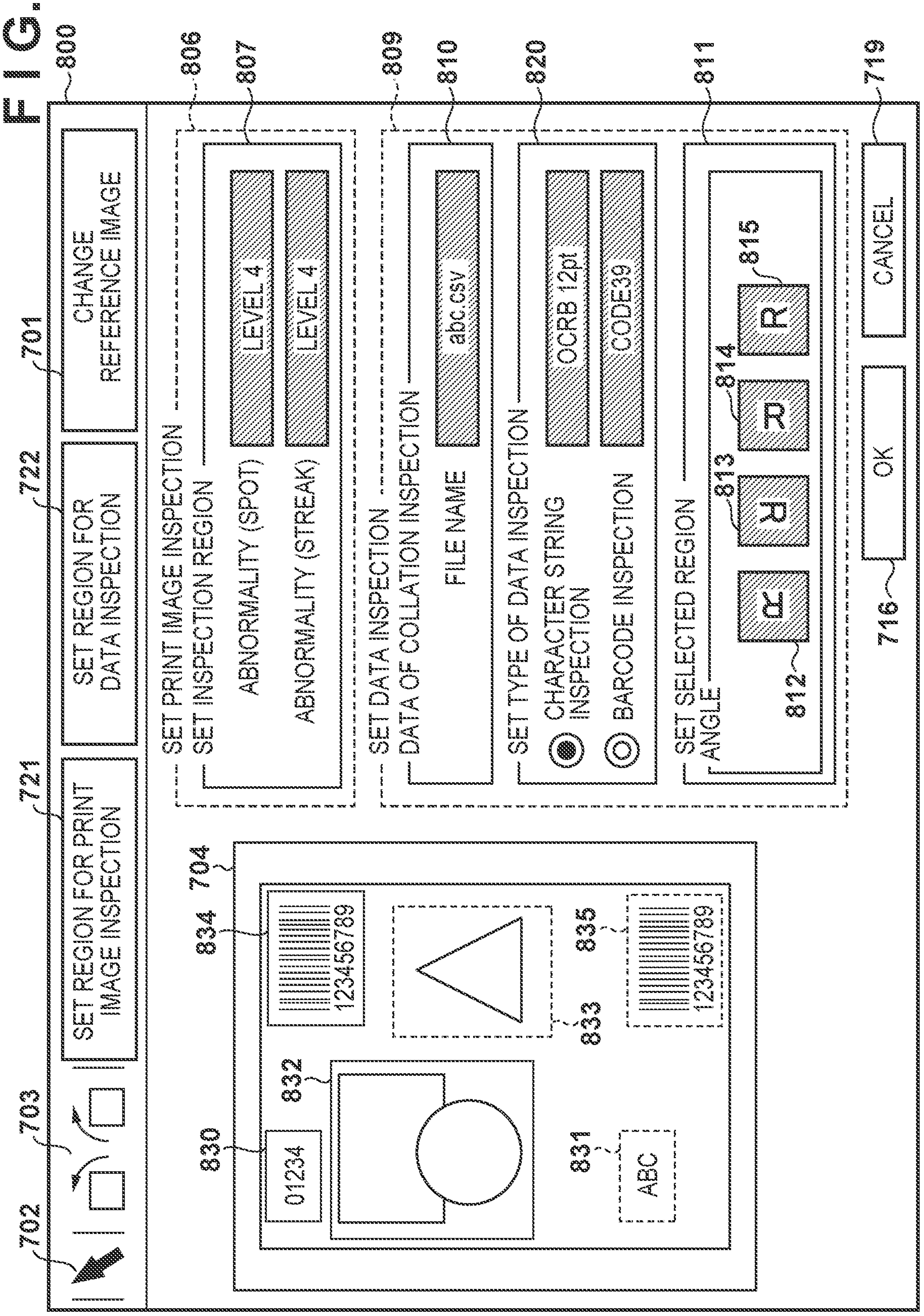

701 — CHANGE REFERENCE IMAGE
722 — SET REGION FOR DATA INSPECTION
721 — SET REGION FOR PRINT IMAGE INSPECTION 702
703
704

806 — SET PRINT IMAGE INSPECTION
807 — SET INSPECTION REGION
- ABNORMALITY (SPOT) — LEVEL 4
- ABNORMALITY (STREAK) — LEVEL 4

809 — SET DATA INSPECTION
810 — DATA OF COLLATION INSPECTION
- FILE NAME: abc.csv 820 — SET TYPE OF DATA INSPECTION
- ● CHARACTER STRING INSPECTION — OCRB 12pt
- ○ BARCODE INSPECTION — CODE39

811 — SET SELECTED REGION ANGLE
- 812: ᴿ
- 813: R
- 814: R
- 815: R

830: 01234
832
833
834: 123456789
835: 123456789
831: ABC

716 — OK
719 — CANCEL

FIG. 11

| | PRINT IMAGE INSPECTION | CHARACTER STRING INSPECTION | BARCODE INSPECTION | CORRESPONDING ID |
|---|---|---|---|---|
| SET ABNORMALITY DETECTION LEVEL | ○ | × | × | UI707 |
| SET COLLATION DATA | × | ○ | ○ | UI710 |
| SET FONT | × | ○ | × | UI720 |
| SET BARCODE TYPE | × | × | ○ | UI720 |
| SET ANGLE | × | ○ | ○ | BUTTON 712<br>BUTTON 713<br>BUTTON 714<br>BUTTON 715 |

INSPECTION APPARATUS, CONTROL METHOD, AND PROGRAM PRODUCT FOR SETTING BATCH INSPECTION CONDITIONS BASED ON REGIONS SELECTED BY USER IN DISPLAYED REFERENCE IMAGE AND INSPECTION TYPE

BACKGROUND OF THE INVENTION

Field of the Invention

The present invention relates to an inspection apparatus, a method for controlling the same, and a storage medium.

Description of the Related Art

In recent years, there have been known inspection apparatuses that automatically inspect a printed material as post-processing of a printing apparatus. In such an inspection apparatus, correct image data is registered in advance. After that, when a print output is performed on a sheet by an image forming apparatus according to inputted image data, the inspection apparatus reads the data that was printed out on the sheet by an inspection sensor. The inspection apparatus detects an abnormality in the printed material by comparing image data (inspection image) read by the inspection sensor with the correct image data (reference image) registered in advance. Such an inspection for detecting an abnormality in a picture portion of the printed material is referred to as a printed image inspection.

In addition, a variable region portion such as a character string or a barcode may also be inspected in variable printing in addition to a printed image inspection. Examples thereof include a data readability inspection for checking whether a character string or a barcode is readable, or a data collation inspection for collating a read result of a character string or a barcode with a correct answer. Hereinafter, the data readability inspection and the data collation inspection are referred to as data inspections. In data inspection, for character recognition (OCR), a user must create a font, which is data in which character codes are associated with glyph images of characters. Note that an operation of creating a font is referred to as glyph registration.

Japanese Patent Laid-Open No. 2020-6603 proposes a technique in which, when correct image data is to be stored, it is determined whether a setting related to a printed image inspection or a setting related to a data inspection has been made for each page, and in a case where a setting related to the data inspection has been made, correct image data of the page is not stored.

However, the above-described conventional technique has the problem described below. In the above-described conventional technique, a technique for switching a method of generating a correct image to be used for data inspection or printed image inspection is described. However, a method of setting an inspection region is not described, and it is not possible to efficiently set the data inspection or the printed image inspection. For example, when the data inspection is performed, in a case where it is desired to read a character string for a plurality of regions, it is necessary to perform a setting for each region. Therefore, there is a problem in that the more the inspection regions there are, the more setting operations there are to be performed.

SUMMARY OF THE INVENTION

The present invention enables realization of a mechanism for efficiently performing a setting relating to an inspection of a printed material.

One aspect of the present invention provides an inspection apparatus comprising: a display unit that specifies regions including an object in an inspection target reference image generated by reading an image formed on a printed material and selectably displaying each of the regions; at least one memory device that stores a set of instructions; and at least one processor that executes the set of instructions to: set in a batch inspection conditions for a plurality of regions selected by a user via the reference image displayed on the display unit, and disable batch setting of the inspection conditions that have been set in a case where the plurality of regions selected by the user include different regions including objects of different inspection types, and enable the batch setting of the inspection conditions that have been set in a case where the plurality of regions selected by the user do not include different regions.

Another aspect of the present invention provides an inspection apparatus comprising: a display unit that specifies regions including an object in an inspection target reference image generated by reading an image formed on a printed material and selectably displaying each of the regions; at least one memory device that stores a set of instructions; and at least one processor that executes the set of instructions to set in a batch inspection conditions for a plurality of regions selected by a user via the reference image displayed on the display unit, and disable setting of all of the inspection conditions before a region is selected by the user, and when a region is selected by the user, enable setting of the inspection conditions corresponding to an inspection type of the selected region.

Still another aspect of the present invention provides a method for controlling an inspection apparatus comprising: specifying regions including an object in an inspection target reference image generated by reading an image formed on a printed material and selectably displaying each of the regions; setting in a batch inspection conditions for a plurality of regions selected by a user via the displayed reference image, and disabling batch setting of the inspection conditions that have been set in a case where the plurality of regions selected by the user include different regions including objects of different inspection types and enabling batch setting of the inspection conditions that have been set in a case where the plurality of regions selected by the user do not include different regions.

Yet still another aspect of the present invention provides a method for controlling an inspection apparatus comprising: specifying regions including an object in an inspection target reference image generated by reading an image formed on a printed material and selectably displaying each of the regions; setting in a batch inspection conditions for a plurality of regions selected by a user via the displayed reference image, and disable setting of all of the inspection conditions before a region is selected by the user, and when a region is selected by the user, enable setting of the inspection conditions corresponding to an inspection type of the selected region.

Still yet another aspect of the present invention provides a non-transitory computer-readable storage medium storing a computing program for causing a computer to execute each process in a method for controlling an inspection apparatus, the control method comprising: specifying regions including an object in an inspection target reference image generated by reading an image formed on a printed material and selectably displaying each of the regions; setting in a batch inspection conditions for a plurality of regions selected by a user via the displayed reference image, and disabling batch setting of the inspection conditions that have been set in a case where the plurality of regions selected by the user include different regions including objects of different inspection types and enabling batch setting of the inspection conditions that have been set in a case where the plurality of regions selected by the user do not include different regions.

Yet still another aspect of the present invention provides a non-transitory computer-readable storage medium storing a computing program for causing a computer to execute each process in a method for controlling an inspection apparatus, the control method comprising: specifying regions including an object in an inspection target reference image generated by reading an image formed on a printed material and selectably displaying each of the regions; setting in a batch inspection conditions for a plurality of regions selected by a user via the displayed reference image, and disable setting of all of the inspection conditions before a region is selected by the user, and when a region is selected by the user, enable setting of the inspection conditions corresponding to an inspection type of the selected region.

Still yet another aspect of the present invention provides an inspection apparatus comprising: a display unit that specifies regions including an object in an inspection target reference image generated by reading an image formed on a printed material and selectably displaying each of the regions; at least one memory device that stores a set of instructions; and at least one processor that executes the set of instructions to, in a case where different regions including objects of different inspection types are not included in a plurality of regions selected by a user via the reference image displayed on the display unit, enable a batch setting of inspection conditions for the plurality of regions.

Further features of the present invention will be apparent from the following description of exemplary embodiments with reference to the attached drawings.

BRIEF DESCRIPTION OF THE DRAWINGS

FIG. 8 is a view illustrating one example of a UI screen of inspection settings at the time of selection of inspection regions of differing inspection types according to an embodiment.

FIG. 11 is a view illustrating determination conditions of enabling and disabling settings for each inspection type according to an embodiment.

DESCRIPTION OF THE EMBODIMENTS

Figure 1:
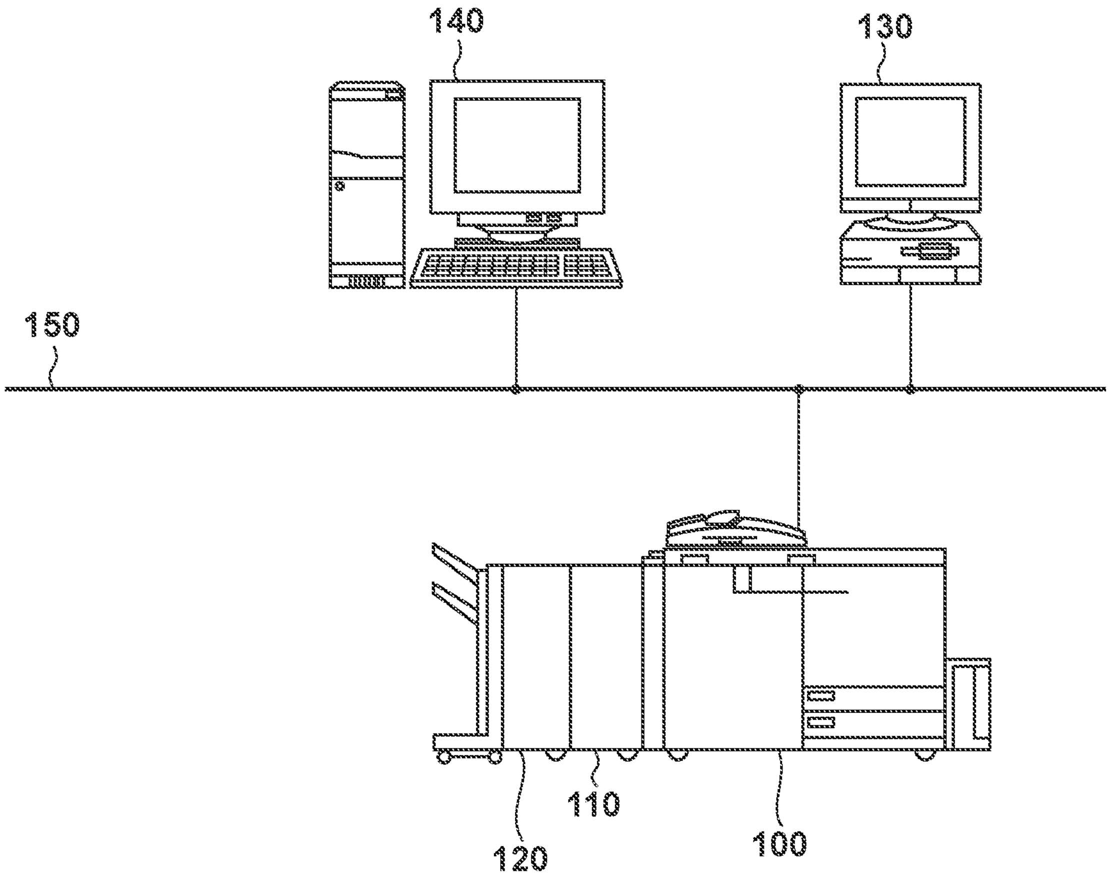
FIG. 1 is a view illustrating an example of a system configuration including an inspection apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

<Overall System Configuration>

Hereinafter, a first embodiment of the present invention is described. First, a system configuration including an inspection apparatus according to an embodiment of the present invention is described with reference to FIG. 1. The present system is configured to include an image forming apparatus 100, an inspection apparatus 110, a finisher 120, a client PC 130, and a print server 140. Each of the apparatuses are communicably connected to each other via a network 150.

The image forming apparatus 100 performs print output based on various types of inputted data, for example, print data sent from the client PC 130 or the print server 140. The inspection apparatus 110 receives a printed material outputted from the image forming apparatus 100, and inspects whether or not there is an abnormality in the received printed material. Here, the abnormality is an abnormality in which a difference is recognized from an expected print output result, and is, for example, a stain generated when a coloring material adheres to an unintended portion at the time of printing, or a color omission occurring when sufficient coloring material does not adhere to an intended portion. Of course, configuration may be taken such that other abnormalities are included. Note that the printed material outputted from the image forming apparatus 100 may be automatically conveyed to the inspection apparatus 110 through a conveyance path, or may be manually inserted into the inspection apparatus 110 by a user.

Also, the inspection apparatus 110 can also inspect a variable region portion such as a character string or a barcode in variable printing. For example, a data readability inspection for checking whether a character string or a barcode is readable, or a data collation inspection for collating a read result of a character string or a barcode with a correct answer can be performed. Therefore, the inspection apparatus 110 according to the present embodiment can perform the printed image inspection and the data inspection as described above.

The finisher 120 receives an outputted sheet that has been inspected by the inspection apparatus 110, switches the sheet discharge destination according to the inspection result of the inspection apparatus 110, performs post-processing (bookbinding or the like) as necessary, and then discharges the product. The image forming apparatus 100 is connected to the client PC 130 and the print server 140 via the network 150. Further, the image forming apparatus 100 is connected to the inspection apparatus 110 and the finisher 120 via a communication cable. In addition to the image forming apparatus 100, the inspection apparatus 110 is also connected to the finisher 120 via a communication cable. In the present embodiment, an in-line inspection machine that performs image formation, inspection, post-processing, and sheet discharging in a consistent manner is described as an example.

<Configuration of Image Forming Apparatus>

Figure 2:
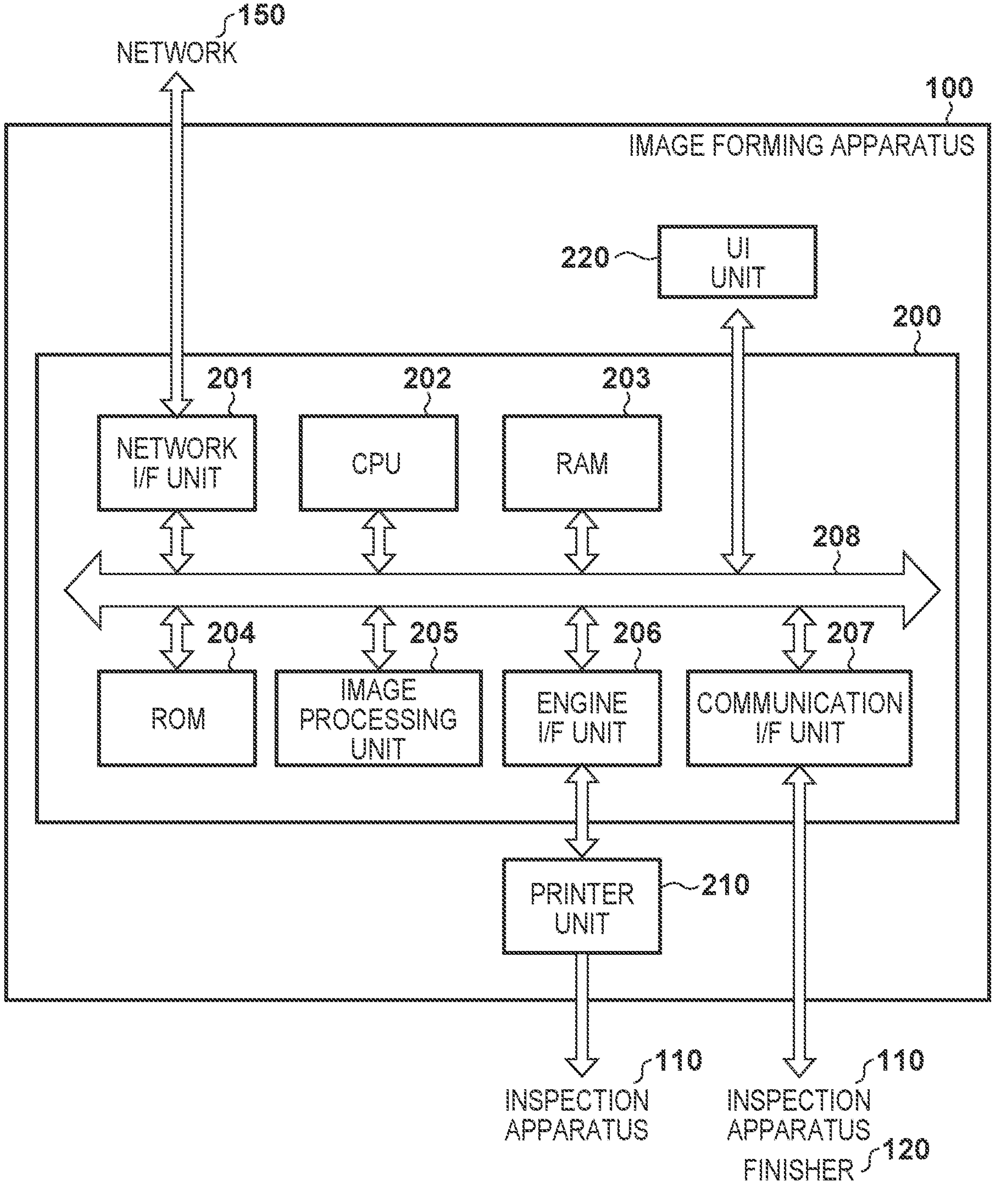
FIG. 2 is a view illustrating an internal configuration of an image forming apparatus 100 according to an embodiment.

Next, an internal configuration of the image forming apparatus 100 according to the present embodiment is described with reference to FIG. 2. The image forming apparatus 100 includes a controller 200, a printer unit 210, and a UI unit 220. The controller 200 converts an image or a document received via the network 150 into print data. The printer unit 210 performs printing on a sheet according to the print data. On the UI unit 220, a user makes an instruction for selecting sheet information or the like to the image forming apparatus 100.

The controller 200 includes a network interface (I/F) unit 201, a CPU 202, a RAM 203, a ROM 204, an image processing unit 205, an engine I/F unit 206, and a communication I/F unit 207. The network I/F unit 201 transmits and receives data to and from an external device via the network 150. The CPU 202 controls the image forming apparatus 100 overall. The RAM 203 is used as a work area when the CPU 202 executes various instructions. The ROM 204 stores program data executed by the CPU 202, setting data of the controller 200, and the like at the time of activation.

The image processing unit 205 executes various types of image processing such as Raster Image Processor (RIP) processing for converting an image or document data received via the network 150 into print data. The image processing unit 205 can also perform the RIP processing for converting image data and document data received via the network 150 into data for a correct image. Specifically, in the RIP processing for correct image data, a resolution of 600 dpi is converted into 300 dpi to generate an image, and in the RIP processing for print data, an image is generated without lowering the resolution, for example.

The engine I/F unit 206 transmits the print data on which the image processing was performed to the printer unit 210. The communication I/F unit 207 controls communication with the inspection apparatus 110 and the finisher 120. Each of the components included in the controller 200 can communicate information with each other via an internal bus 208.

An image or a document created by the client PC 130 or the print server 140 is transmitted as PDL data to the image forming apparatus 100 via the network (a Local Area Network, for example) 150. The transmitted PDL data is stored in the RAM 203 via the network I/F unit 201. A print instruction by a user made on the UI unit 220 is also stored in the RAM 203 via the internal bus 208. The print instruction by the user is, for example, a selection of a sheet type.

The image processing unit 205 obtains the PDL data stored in the RAM 203, and executes image processing for converting the obtained data into print data. The image processing for converting the obtained data into print data is, for example, performing rasterization on the PDL data, converting the data into multi-valued bitmap data, and performing screen processing or the like to convert the data into binary bitmap data. The binary bitmap data obtained by the image processing unit 205 is transmitted to the printer unit 210 through the engine I/F unit 206.

The printer unit 210 prints the received binary bitmap data on a sheet using a coloring material. The CPU 202 outputs an instruction to the printer unit 210 based on the print instruction from the user stored in the RAM 203. For example, in a case where the user gives an instruction to print on a coated sheet, the CPU 202 instructs the printer unit 210 to output a sheet from a sheet cassette (not shown) in which a coated sheet is stored within the image forming apparatus 100. Various processing, from receiving the PDL data described above to printing on a sheet, are controlled by the CPU 202 to form a full-color toner image on the sheet.

<Internal Configuration of Inspection Apparatus 110>

Figure 3:
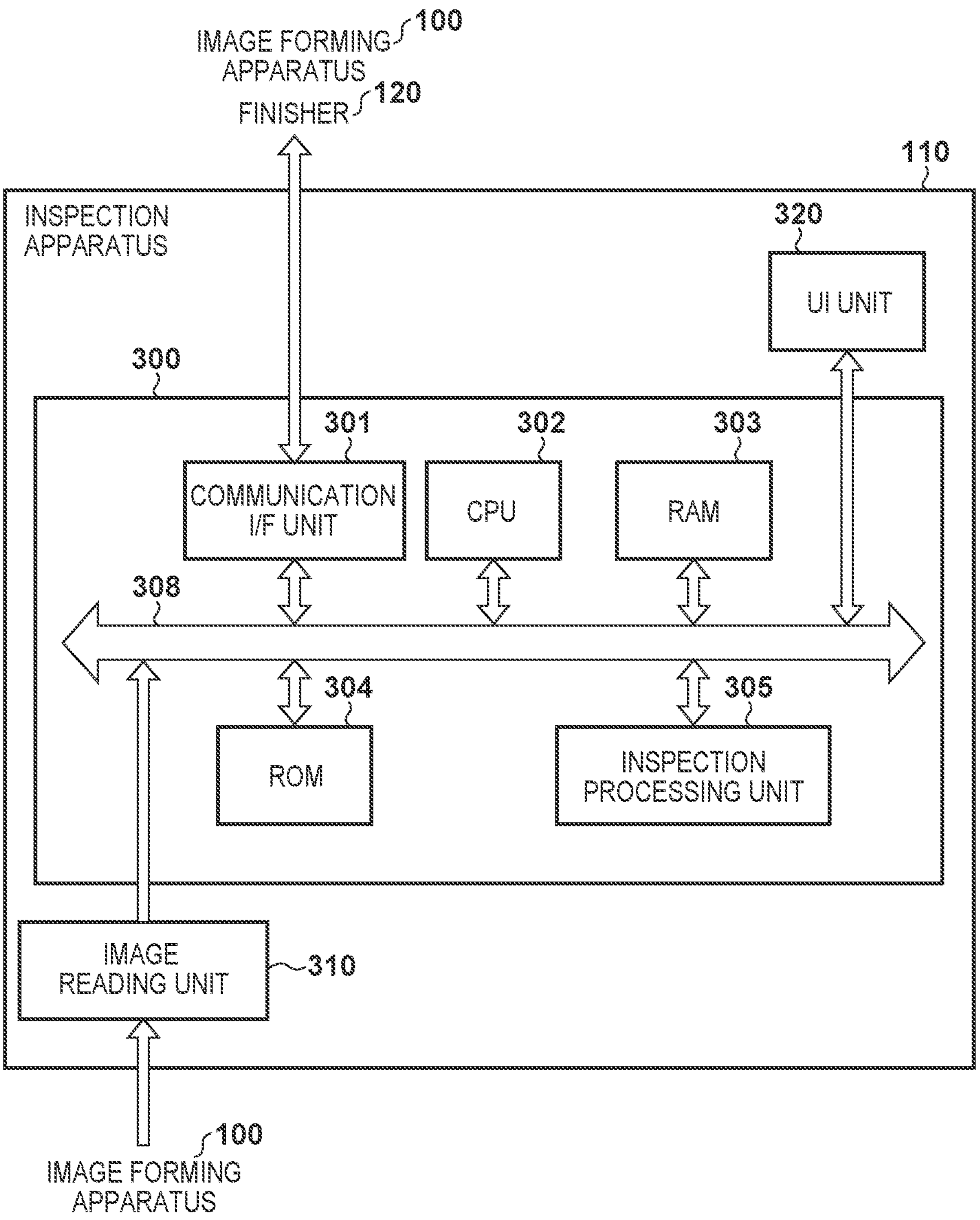
FIG. 3 is a view illustrating an internal configuration of an inspection apparatus 110 according to an embodiment.

Next, an internal configuration of the inspection apparatus 110 according to the present embodiment is described with reference to FIG. 3. The inspection apparatus 110 includes an inspection control unit 300, an image reading unit 310, and a UI unit 320. The inspection control unit 300 controls the entire inspection apparatus 110, inspects whether or not there is an abnormality in a printed material, and inspects variable region portions such as a character string or a barcode. The image reading unit 310 reads a printed material conveyed from the image forming apparatus 100. The user uses the UI unit 320 to perform settings of the inspection apparatus 110 and the UI unit 320 displays inspection results to the user. Here, the settings of the inspection apparatus 110 that the user performs are items indicating what abnormalities are to be inspected when inspecting the printed material. An inspection item is, for example, a detection of a round shape abnormality (spot) and a linear abnormality (streak), and a determination of correctness in regards to a variable region portion such as a character string or a barcode.

The inspection control unit 300 includes a communication I/F unit 301, a CPU 302, a RAM 303, a ROM 304, and an inspection processing unit 305. Each of the components can communicate information with each other via an internal bus 306. The communication I/F unit 301 transmits and receives data to and from the image forming apparatus 100 and the finisher 120. The CPU 302 controls the entire inspection apparatus 110. The RAM 303 is used as a work area when the CPU 302 executes various instructions. The ROM 304 stores program data executed by the CPU 302, setting data of the inspection control unit 300, and the like at the time of activation. The inspection processing unit 305 inspects whether or not there is an abnormality in the printed material.

(Printed Image Inspection)

Here, a summary of the printed image inspection performed by the inspection apparatus 110 is described. The inspection apparatus 110 reads the printed material conveyed from the image forming apparatus 100 by the image reading unit 310, and obtains a scanned image of an inspection target. The obtained scanned image of the inspection target is stored in the RAM 303. Subsequently, the inspection apparatus 110 compares the reference image, as the correct image stored in advance in the RAM 303, with the scanned image of the inspection target by the inspection processing unit 305, and obtains a difference value.

Next, the inspection apparatus 110 performs inspection by comparing the obtained difference value with an inspection threshold value (contrast and size) of each inspection item for each pixel. The inspection result is stored in the RAM 303. For example, information on whether or not there is an abnormality in the printed material, a type of the detected abnormality (a spot or a streak), position information of the abnormality when displayed on the UI unit 320, or the like are included in the stored information.

(Data Inspection)

Next, an outline of the data inspection performed by the inspection apparatus 110 is described. The inspection apparatus 110 reads the printed material conveyed from the image forming apparatus 100 by the image reading unit 310, and obtains a scanned image of an inspection target. The obtained scanned image of the inspection target is stored in the RAM 303.

Subsequently, the inspection apparatus 110 inspects whether or not a character string or a barcode can be read by the inspection processing unit 305 using a font for character recognition (OCR processing) or a barcode standard set in advance. In addition, it is also possible to perform a data collation inspection for collating to determine whether the read character string or the result of the barcode matches the correct data. The inspection result is stored in the RAM 303. For example, a result of a character string or a barcode read from a printed material, a result of a collation with correct data, position information of a character or a barcode read when the character or barcode is displayed on the UI unit 320, or the like may be included in the stored information.

(Inspection Result Output)

Next, an output of an inspection result by the inspection apparatus is described. The inspection apparatus 110 instructs, by the CPU 302, the UI unit 320 to display an inspection result stored in the RAM 303. The user can recognize the inspection result by the inspection result being displayed on the UI unit 320.

Also, the inspection apparatus 110 transmits, by the CPU 302, the above-described information to the image forming apparatus 100 through the communication I/F unit 301 in a case where a certain number of printed materials with an abnormality have been continuously generated. The communication I/F unit 207 receives, via the controller 200, the information indicating that printed materials with an abnormality have been continuously generated. When the controller 200 receives the above-described information, the CPU 202 instructs the printer unit 210 to stop printing. The image forming apparatus 100 stops the printing operation upon an instruction to terminate printing made to the printer unit 210.

Furthermore, the inspection apparatus 110, by the CPU 302, transmits the information to the finisher 120 via the communication I/F unit 301 based on the inspection result stored in the RAM 303. The information transmitted to the finisher 120 is information indicating whether or not there is an abnormality in the printed material. By using the received information, the finisher 120 discharges a printed material having no abnormality to a normal sheet discharge tray and a printed material having an abnormality to a tray different from the normal sheet discharge tray.

<Overall Processing>

Figure 4:
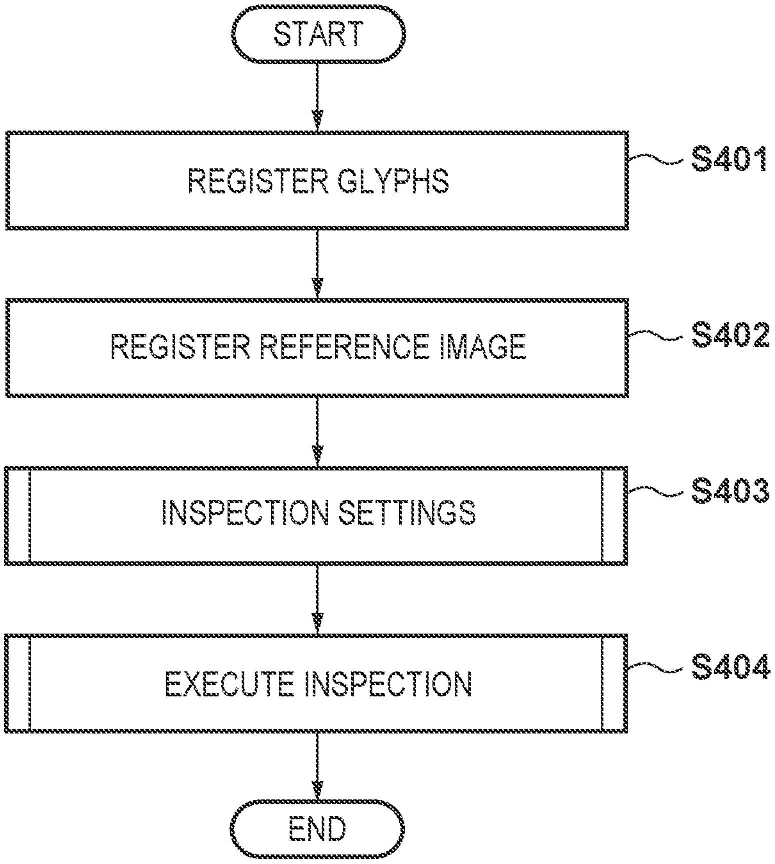
FIG. 4 is a flowchart of an inspection process as a whole according to an embodiment.

Next, with reference to FIG. 4, the entire processing sequence from registration work before the start of inspection to an execution of the inspection in the inspection processing unit 305 according to the present embodiment is described. Each process in FIG. 4 is executed by the inspection apparatus 110 in accordance with an operation on the client PC 130 by the user. The processing of the inspection apparatus 110 described below, is realized by the CPU 302 loading a program code stored in the ROM 304 into the RAM 303 and executing the loaded program. Note, it is assumed that data created during the processing of the inspection apparatus 110 is temporarily stored in the RAM 303 or a storage unit (not shown).

First, in step S401, the CPU 302 registers glyphs by creating a font. The glyphs registered here is used at the time of data inspection. The font is data in which glyph images of characters and character codes required for character recognition (OCR) to be performed at the time of data inspection are associated with each other. Note that there may be cases where only the printed image inspection is performed without performing the data inspection. In such cases, the processing in step S401 is not performed, and the processing advances to step S402.

In the sequence of creating a font, firstly, the inspection apparatus 110 waits in a read mode for a font image and accepts a print job for creating a font from the client PC 130. The inspection apparatus 110 accepts a font job of the client PC and reads the font image. When printing is executed, the inspection apparatus 110 detects conveyance of a sheet, scans the sheet by the image reading unit 310, and stores the scanned image in the RAM 303 of the inspection apparatus 110. The font is created by characters for performing OCR being cut out one character at a time from the scanned image and character codes for character images that were cut out being inputted by the user. The present embodiment is not limited to this method for creating a font, and any method may be used as long as the method can create data in which character codes are associated with each character image cut out from a scanned image.

Next, in step S402, the CPU 302 registers the reference image which is a correct image for the inspection. The inspection apparatus 110 waits in the read mode for the reference image, and executes a print job for registering the reference image from the client PC 130. When printing is executed, the inspection apparatus 110 detects conveyance of a sheet, scans the sheet by the image reading unit 310, and stores the scanned image as the reference image in the RAM 303 of the inspection apparatus 110.

Next, in step S403, the CPU 302 sets various inspection parameters such as an inspection region and an inspection level in accordance with inspection settings by the user. Note, details of step S403 of the present embodiment are described later. Subsequently, in step S404, the CPU 302 accepts a print job for inspection from the client PC 130, detects conveyance of the sheet, scans the sheet by using the image reading unit 310, and stores the scanned image (inspection image) in the RAM 303 of the inspection apparatus 110. Then, the CPU 302 performs the inspection by using the inspection parameters set in step S403 and the inspection image resulting from scanning according to the inspection job and the reference image registered in step S402. Note, details of step S404 of the present embodiment are described later. The above is a description of the overall flow from the registration operation before the start of the inspection to the execution of the inspection in the present embodiment.

<Inspection Settings>

Figure 5:
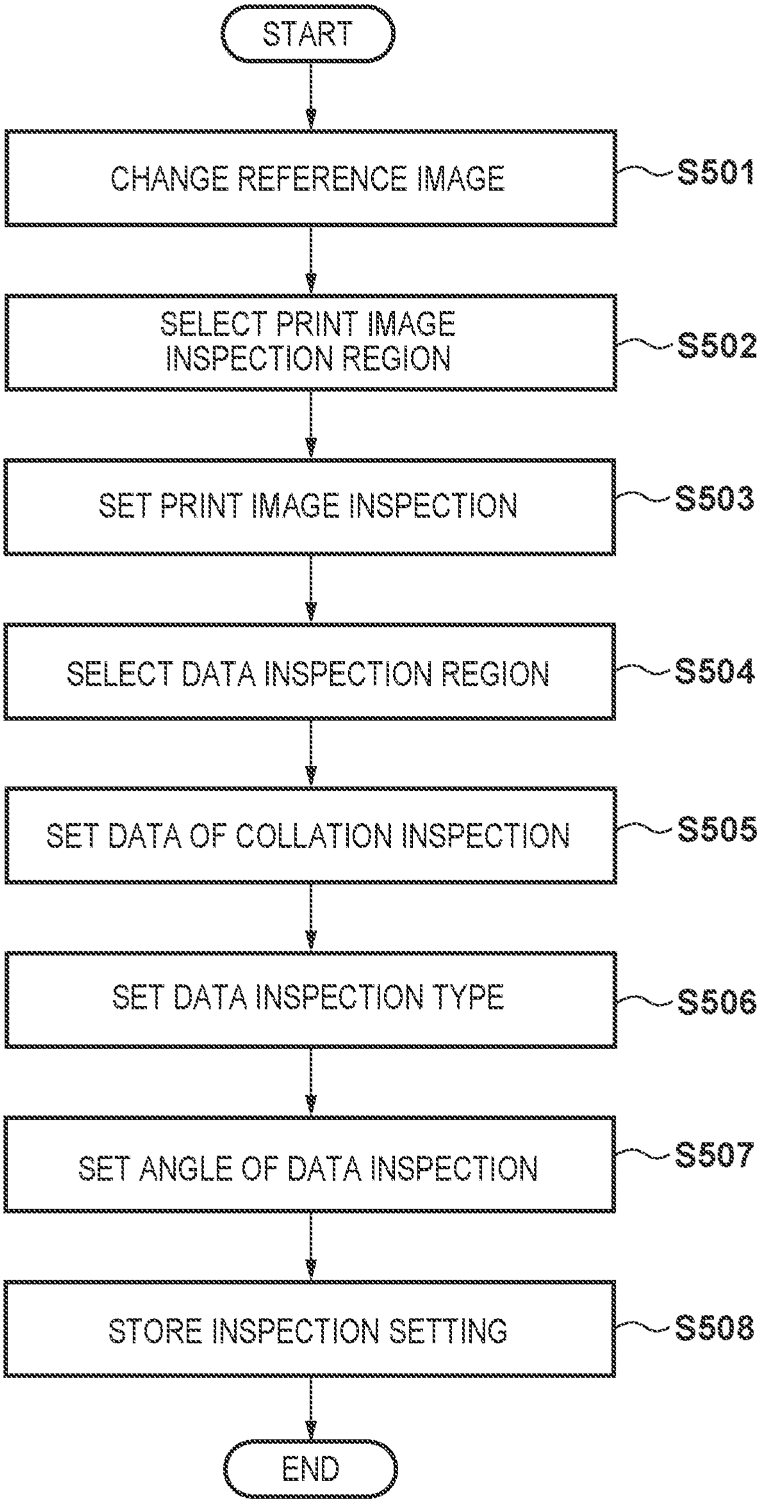
FIG. 5 is a flowchart of an inspection setting of step S403 according to an embodiment.

Next, with reference to FIG. 5, a processing sequence for performing settings related to the inspection in step S403 is described. By performing the processing of this flowchart, the inspection apparatus 110 sets, in accordance with inspection settings by the user, various inspection parameters such as an inspection region and an inspection level for printed image inspection and data inspection. The processing of the inspection apparatus 110 described below, is realized by the CPU 302 loading a program code stored in the ROM 304 into the RAM 303 and executing the loaded program.

Figure 7:
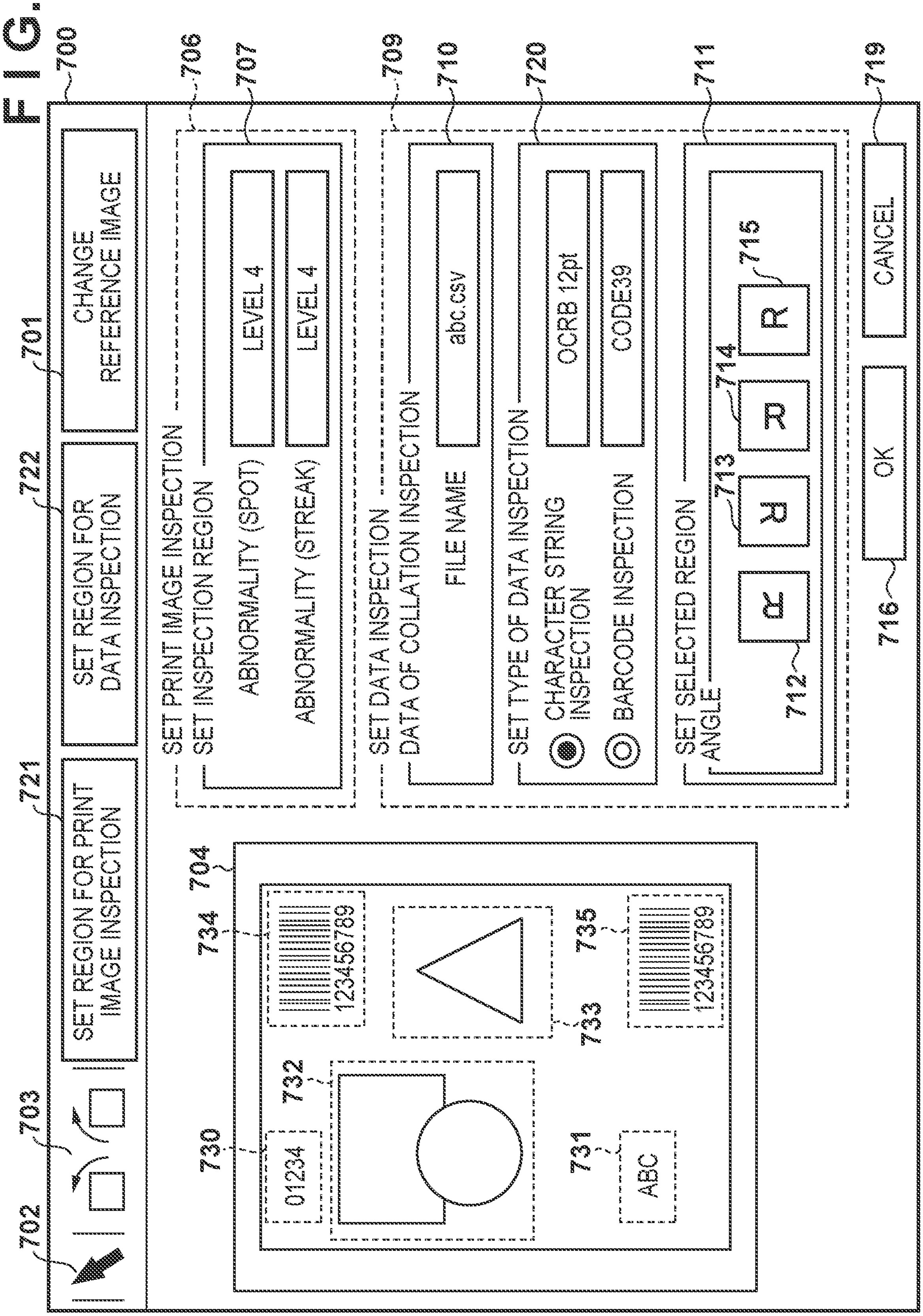
FIG. 7 is a view illustrating one example of a UI screen of inspection settings according to an embodiment.

First, an example of a UI relating to an inspection setting is described with reference to FIG. 7. A UI screen 700 illustrated in FIG. 7 is displayed on the UI unit 320 of the inspection apparatus 110 when items related to the inspection of step S403 are to be set. A button 701 is a button for changing the reference image, and is used for changing the reference image. A button 702 is a selection button for selecting an inspection region. When the selection button 702 is selected, one or more regions among a plurality of regions surrounded by dashed lines in the image displayed in a page preview 704 can be selected. As a method of selection, in a case where the UI unit 320 is configured by a touch panel display, the selection button 702 can be selected by performing a touch operation on a region to be selected, for example. Also, when the touch operation is performed again on a region in a selected state, the selected state may be cancelled. As described above, the selection button 702 is a button that is pressed by the user when the user desires to change the setting information of a region that has previously been set.

The page preview 704 is a display screen for displaying the reference image read in step S402. Buttons 703 are buttons for rotating the image displayed in the page preview 704. A button 721 is a button that is pressed by the user when setting a printed image inspection region. Therefore, when one or more regions are selected from a plurality of regions within the image displayed in the page preview 704 while the button 721 is selected, the selected regions are set as picture images. A button 722 is a button that is pressed by the user when setting a data inspection region. Therefore, when one or more regions are selected from among a plurality of regions within the image displayed in the page preview 704 while the button 722 is selected, the selected regions are set as data inspection target regions in which a character string, barcode, or the like is formed.

A UI 706 is a UI group for setting the level of abnormalities to be detected in a case where a printed image inspection is performed. Details of the UI 706 are described later. A UI 709 is a UI group for setting a data file, which is to be referenced when collating detected data, the type of data inspection, and detailed information thereof in a case where the data inspection is to be performed. Details of the UI 709 are described later. A button 716 is a button for executing the inspection after all inspection settings are completed. A button 719 is a button for suspending the inspection setting, and when the button 719 is pressed by the user, the information that has been set is discarded, and the inspection setting is ended.

A description regarding FIG. 5 is given. Note that in the processing described below, settings related to the inspection are performed in accordance with a user operation, and the processing is not necessarily controlled in the order described below. That is, the processing described below is executed in any order to the extent possible in accordance with the user operation.

First, in step S501, the CPU 302 changes the reference image registered in step S402 in accordance with the inspection settings of the user. For example, in a case where there is an abnormality in a picture portion of the reference image registered in step S402, a correct inspection cannot be performed. In such a case, the user can change the reference image by pressing the button 701. When the button 701 has been pressed, the CPU 302 waits in the read mode for a reference image, and executes a print job for registering the reference image from the client PC 130. When printing is executed, the CPU 302 detects conveyance of a sheet, scans the sheet by the image reading unit 310, and stores the scanned image as the reference image in the RAM 303 of the inspection apparatus 110. Then, the CPU 302 changes the image displayed in the page preview 704 to a scanned image.

Next, in step S502, the CPU 302 sets a region for the printed image inspection according to the inspection setting of the user. More specifically, the CPU 302 specifies one or more regions within the obtained reference image in which an object such as a character string, a barcode, an image, or the like is printed, and displays the specified regions on the UI unit 320 so that the regions are selectable. Configuration may be taken such that these regions are set by specifying a set of printed pixels. In this case, the pixels included in the set do not have to be consecutive, and a certain amount of spacing (blank pixels) may be included therein. In other words, regions that are segmented off by a predetermined number of blank pixels of or more are specified. Note that the regions may be specified by the user. For example, as illustrated in FIG. 7, which is described later, the specified regions are surrounded by a dashed line frame and are displayed so as to be selectable. According to the present embodiment, an inspection condition of the printed image inspection can be set for one or more of the specified regions, and the setting is performed by the following sequence. First, the printed image inspection region setting button 721 is pressed by a user operation. Subsequently, one or more regions in the page preview 704 for which a printed image inspection is desired are selected by a user operation. As a result, the inspection apparatus 110 sets the selected corresponding specified ranges as printed image inspection regions 732 and 733. Note, the printed image inspection region is an inspection region for detecting an abnormality of a picture portion of the printed material.

Next, in step S503, the CPU 302 sets detection items in which an abnormality is to be detected in the printed image inspection and sets detection levels thereof in a UI 707 in accordance with the inspection setting of the user. The detection items for printed image inspection are item relating to an abnormality feature to be detected when a printed material is inspected, and are, for example, a round shape abnormality (spot) or a linear abnormality (streak). The detection level is a parameter and is set at a different level depending on a size at which to determine an abnormality for each detected abnormality feature. For example, there may be five levels from level 1 to level 5, and at level 5, thinner and smaller sized abnormalities may be detected than at level 1. In addition, levels can be set for each inspection item; for example, inspection level 5 may be set for spots and inspection level 4 for streaks. The UI 707 illustrates that the abnormality (spot) inspection level setting has been selected to be level 4 by the user and that the abnormality (streak) inspection level setting has been selected to be level 4 by the user.

Next, in step S504, the CPU 302 sets a region for the data inspection according to the inspection setting of the user. The following sequence is a method of setting a data inspection region in the present embodiment. First, the set region for data inspection button 722 is pressed by a user operation. Then, one or more regions in the page preview 704 for which data inspection is to be performed are selected by a user operation. As a result, the inspection apparatus 110 sets the selected corresponding specified ranges as data inspection regions 730 and 731 for a character string inspection and data inspection regions 734 and 735 for a barcode inspection. Note that the data inspection regions are inspection regions for which correctness is determined by reading the type (character string or barcode) of set data.

Next, in step S505, the CPU 302 sets, in accordance with the inspection setting of the user, a file of collation inspection data to be used as correct character information when the correctness is to be determined by the data inspection of a UI 710 upon selection of a file selection. The data of the collation inspection in the present embodiment is a reference CSV file for data inspection collated when the data inspection is performed. The reference CSV file is a file that should be prepared in advance by the user, and is a file that lists the correct character strings for the character string inspection and the barcode inspection. At the time of execution of the data inspection, the CPU 302 collates the character string inspection regions and the barcode read results with the correct character strings listed in the reference CSV file. In the UI 710 of FIG. 7, the data of the filename "abc.csv" is selected as the data for the collation inspection.

Next, in step S506, the CPU 302 sets, in accordance with the inspection setting of the user, the type of the character string inspection or the barcode inspection selected by the user by using a pull-down within the setting for the type of the data inspection of a UI 720. The type of character string in the present embodiment is a font type registered in step S401. In the UI 720 of FIG. 7, "OCRB 12 pt" is selected as the font of the character string inspection. Further, the type of the barcode in the present embodiment is a barcode standard supported by the data inspection. For example, a one-dimensional barcode such as CODE39 or JAN, or a two-dimensional code such as a QR code or a Data Matrix code is made to be selectable in the UI 720 as long as the standard is compatible with the data inspection. In the UI 720 of FIG. 7, "CODE39" is selected as the barcode inspection. According to the present embodiment, since the data inspection regions 730 and 731 are character strings, "OCRB 12 pt" is set as the type of the data inspection, and since the data inspection regions 734 and 735 are barcode inspections, "CODE39" is set.

Next, in step S507, the CPU 302 sets, in accordance with the inspection setting of the user, the direction (angle) in which the character strings and the barcodes are to be read when data inspection is performed by using any of direction setting buttons 712 to 715 of a UI 711. The direction setting buttons 712 to 715 are buttons corresponding to 0°, 90°, 180°, and 270°, which differ in units of 90° clockwise from the conveyance direction of a sheet. Since the conveyance direction of the sheet is leftward as viewed from the page preview 704 of FIG. 7, an angle setting corresponding to the direction setting button 712 is set to 0°. The direction setting buttons 712 to 715 are set so as to correspond to the displayed angle (direction) of the character string or the barcode displayed in the page preview 704. The setting indicating the direction in which the character strings and the barcodes are to be read in the present embodiment has been described using an example in which the direction setting buttons 712 to 715 are used, but the present embodiment is not limited thereto, and any UI capable of setting the direction (for example, a radio button or the like) may be used. Then, when the OK button 716 is pressed by the user in step S508, the CPU 302 stores the content of the inspection settings in the RAM 303 and ends the processing of this flowchart.

The above is a description of the flow of the processing for performing settings relating to the inspection of step S403 according to the present embodiment. Note that the settings related to printed image inspection and data inspection during the setting operation of the user in FIG. 5 can be adjusted again even after having been set. Further, as already described above, a plurality of regions for printed image inspection set in step S502 and a plurality of regions for data inspection set in step S504 can be selected, and inspection ranges of the plurality of regions can be adjusted in a batch. Processing for switching enabling and disabling of the setting UI related to inspection settings in a case where a plurality of regions are selected is described later.

<Inspection Processing>

Figure 10:
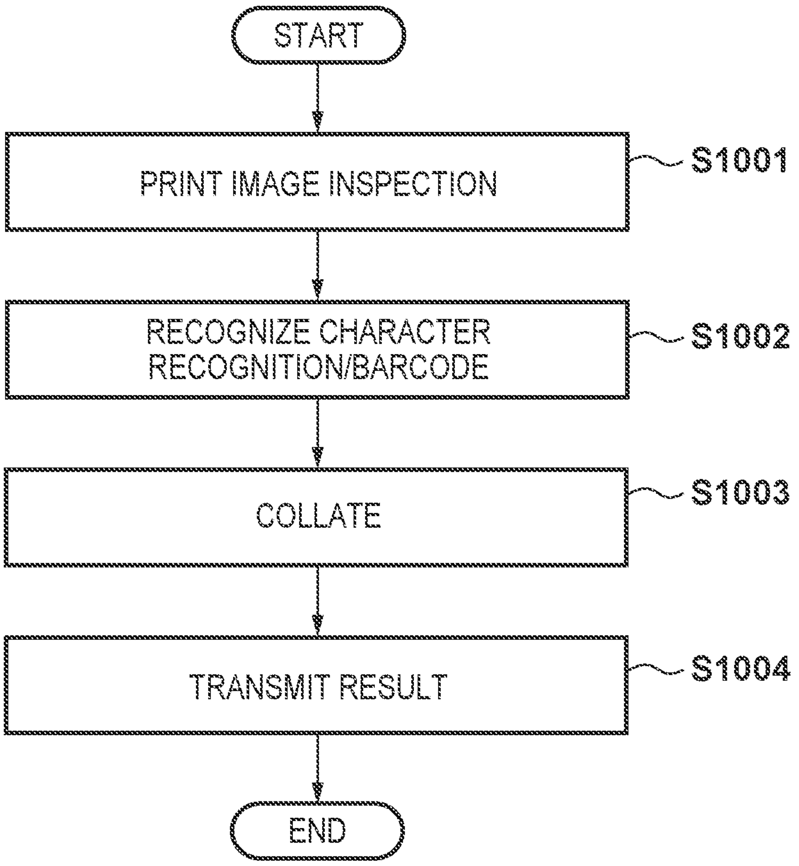
FIG. 10 is a flowchart for execution of an inspection of step S404 according to an embodiment.

Next, with reference to FIG. 10, a processing sequence by the inspection apparatus 110 performed after the inspection settings is described; this processing sequence is the execution of the inspection in step S404. The processing of the inspection apparatus 110 described below, is realized by the CPU 302 loading a program code stored in the ROM 304 into the RAM 303 and executing the loaded program. The inspection apparatus 110 performs an inspection by using the inspection processing unit 305 when an inspection start button (not shown) displayed on the UI unit 320 is pressed by the user.

First, in step S1001, the inspection processing unit 305 detects an abnormality (spot) and an abnormality (streak) included in the sheet as abnormalities at the time of printing in accordance with inspection settings performed by the user in step S403. In the present embodiment, a printing abnormality is detected by extracting a difference between the reference image registered in step S402 and the scanned image of a corresponding print job to detect an abnormality (spot) and an abnormality (streak) from features of an extracted difference image. The present invention is not limited to the present embodiment, and a known method for detecting an abnormality during printing may be used.

Next, in step S1002, the inspection processing unit 305 performs OCR or barcode recognition of the data inspection region in accordance with the inspection settings performed by the user in step S403. The OCR in the present embodiment is performed by the following sequence. First, an OCR target region is segmented into individual characters. Then, a degree of similarity between glyph images registered in the font and the segmented characters is obtained by using the font registered in step S401, and a character code corresponding to the glyph image having the highest degree of similarity is set as a result for the individual characters. The result of the OCR is a character string obtained by combining the results of all the segmented characters. The present invention is not limited to the present embodiment, and any known method may be used as long as the OCR uses a font.

Next, in step S1003, the inspection processing unit 305 collates the character recognition result and the barcode recognition result obtained in step S1002 with the correct character strings listed in the collation inspection file set in step S505. Then, the correctness determination result is outputted as an inspection result. Subsequently, in step S1004, the inspection processing unit 305 transmits the inspection result obtained in step S1003 to the UI unit 320, and ends the processing of this flowchart.

Here, when the inspection result is received, the UI unit 320 displays the scanned image of the inspection target and the inspection result to the user. In a case where there is an abnormality in the printed material, the UI unit 320 highlights the detected abnormality with a dashed line frame, a color frame, or the like on the scanned image, and also displays the type of the detected abnormality (a spot or a streak), position information, or the like. On the other hand, in a case where there is no abnormality in the printed material, a character string indicating no abnormality is displayed. Note that the method of displaying inspection results by the UI unit 320 is not limited to this method, and configuration may be taken such that the detection results are displayed in an easy to understand manner to the user.

Further, the inspection processing unit 305 transmits the inspection result obtained in step S1003 to the image forming apparatus 100 and the finisher 120. The information transmitted to the image forming apparatus 100 is information indicating that a certain number of printed materials in which there is an abnormality has been continuously generated. The information transmitted to the finisher 120 is information indicating whether or not there is an abnormality in the printed material. As described above, when the above-described information is received, the image forming apparatus 100 stops the printing operation. By using the received information, the finisher 120 discharges a printed material having no abnormality to a normal sheet discharge tray and a printed material having an abnormality to a tray different from the normal sheet discharge tray. Description relating to the operation of the inspection apparatus 110 after the setting of the inspection of step S404 has been given above.

<Enabling and Disabling Switching Processing>

Figure 6:
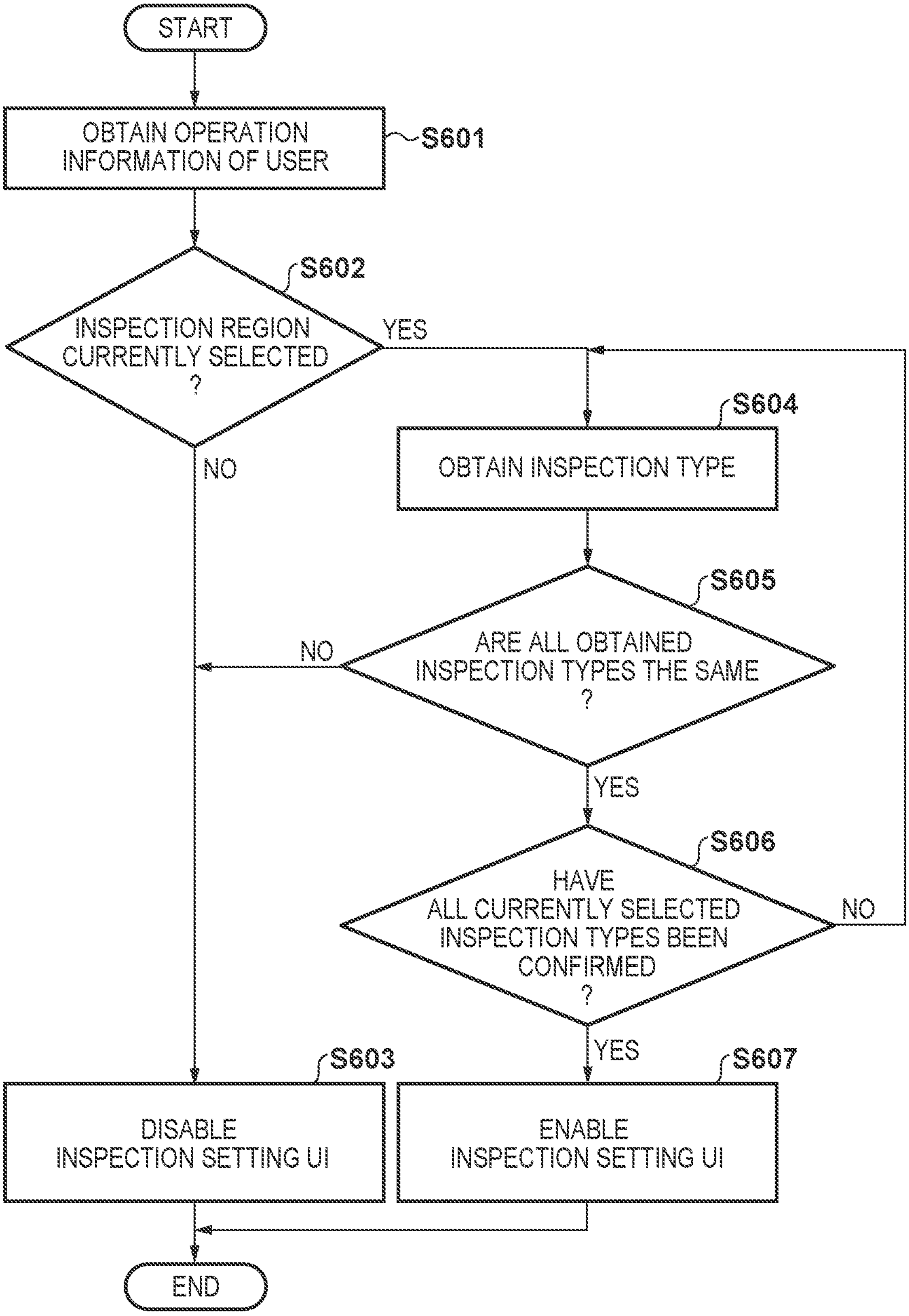
FIG. 6 is a flowchart of switching processing for enabling and disabling a UI setting according to an embodiment.

Next, with reference to FIG. 6, description is given regarding a processing sequence of processing for switching whether to enable or disable a UI setting, which is invoked whenever the user operates the UI when the user performs the inspection setting of step S403 with in regards to the set printed image inspection and data inspection. The processing of the inspection apparatus 110 described below, is realized by the CPU 302 loading a program code stored in the ROM 304 into the RAM 303 and executing the loaded program. By executing the processing of this flowchart, the inspection apparatus 110 determines whether or not an inspection region of the same inspection type is selected for the printed image inspection and the data inspection when one or more inspection regions are selected in accordance with a user operation. In a case where the same inspection type is selected, a change of settings of the corresponding UI is enabled, and in a case where different inspection types are selected, a change of settings is disabled for all UIs. UI screens at this time are described with reference to FIGS. 8 and 9.

First, in step S601, the CPU 302 obtains information of an operation on a UI 700 in accordance with the inspection setting of the user. Here, the operation information in the present embodiment is information related to any operation such as an operation of a setting related to a printed image inspection, an operation of a setting related to a data inspection, a setting related to an inspection region, and a region selection. Subsequently, in step S602, the CPU 302 determines whether or not, for the operation information obtained in step S601, one or more regions of the printed image inspection regions set in step S502 or the data inspection regions set in step S504 have been selected. In a case where the input is an input other than a corresponding region selection, the processing advances to step S603, and the CPU 302 performs processing for disabling operation of the setting UIs for each inspection, and ends the processing of this flowchart.

A UI screen 800 of FIG. 8 is a UI screen displayed on the UI unit 320 of the inspection apparatus 110 when items related to the inspection of step S403 are to be set. Regarding UIs similar to the UIs described with reference to FIG. 7, the same reference numerals are given, and description thereof is omitted. A description is given of changes to the UI in a case where an operation of the setting UI for each inspection is disabled. Here, a case in which a printed image inspection region 832 for inspecting a picture, a data inspection region 830 for inspecting a character string, and a data inspection region 834 for inspecting a barcode are simultaneously selected is envisioned as an example of selecting inspection regions of a different inspection type.

UIs 806 and 807 are UIs relating to setting the level of abnormalities detected by the printed image inspection of the UI 706 and the UI 707 of FIG. 7. In a case where operation of the setting UI is disabled in step S603, the settings of each abnormality level are displayed as grayed out as in the UI 807, and operation by the user is disabled. That is, the user cannot perform a setting operation in the UI 807.

A UI 810 included in a UI 809 is a UI related to the setting of a collation inspection data file used in the data inspection of the UI 710 of FIG. 7. In a case where the operation of the setting UI is disabled in step S603, the setting of the collation inspection data file is displayed as grayed out as in the UI 810, and operation by the user is disabled. That is, the user cannot perform a setting operation in the UI 810.

A UI 820 included in a UI 809 is a UI related to settings of the type of the character string inspection or the barcode inspection of the UI 720 of FIG. 7. In a case where operation of the setting UI is disabled in step S603, the settings of the type of the character string inspection or the barcode inspection are displayed as grayed out as in the UI 820, and operation by the user is disabled. That is, the user cannot perform a setting operation in the UI 820.

A UI 811 and buttons 812 to 815 included in the UI 809 are each a UI regarding setting of the direction in which a character string and the barcode are read and are the direction setting buttons 712 to 715 for setting the direction when a data inspection is performed on the UI 711 of FIG. 7. In a case where the operation of the setting UI is disabled in step S603, the direction setting buttons are displayed as grayed out as the buttons 811 to 815, and operation by the user is disabled. That is, the user cannot perform a setting operation in the UI 811. If the operation by the user regarding the inspection setting UI is disabled in step S603, the processing for switching whether to enable or disable the UI setting in FIG. 6 ends.

Although all UI setting changes related to inspection setting are disabled in the disabling processing of step S603 in the present embodiment, the present invention is not limited to the present embodiment, and configuration may be taken such that only specific settings are disabled. For example, it is assumed that the UIs 806 and 807 for setting the abnormality level to be detected in printed image inspection are not adjusted for each region, but are rather adjusted to a level common to all regions. In this case, configuration may be such that the UI is not displayed to be grayed out and setting changes are accepted thereby. Also, although operation by the user is disabled regarding the inspection setting UI, configuration may be taken such that an operation (for example, operations related to inspection regions such as moving, deleting, or copying a region) related to a plurality of selected regions is accepted.

On the other hand, in a case where the operation is determined in step S602 to be a region selection input, the CPU 302 obtains in step S604 the inspection type of one inspection region among the regions selected in the operation information obtained in step S601. Subsequently, in step S605, the CPU 302 determines whether the inspection types of the inspection regions obtained in step S604 so far are all the same type. In a case where different inspection types are included, the processing advances to step S603, and the CPU 302 executes processing for disabling the operation of the setting UI for each inspection, and ends the processing of this flowchart.

On the other hand, if it is determined in step S605 that all the inspection types are the same, the processing advances to step S606, and the CPU 302 determines whether all of the inspection regions selected in step S604 have been confirmed. In a case where not all of the inspection regions selected have been confirmed, the processing returns to step S604 and repeats the processing until all inspection regions have been confirmed. In a case where all of the selected inspection regions have been confirmed, the processing advances to step S607, and the CPU 302 executes processing for enabling operation of the inspection setting UI corresponding to the inspection type which is the same for the selected inspection regions, and ends the processing of this flowchart.

Figure 9:
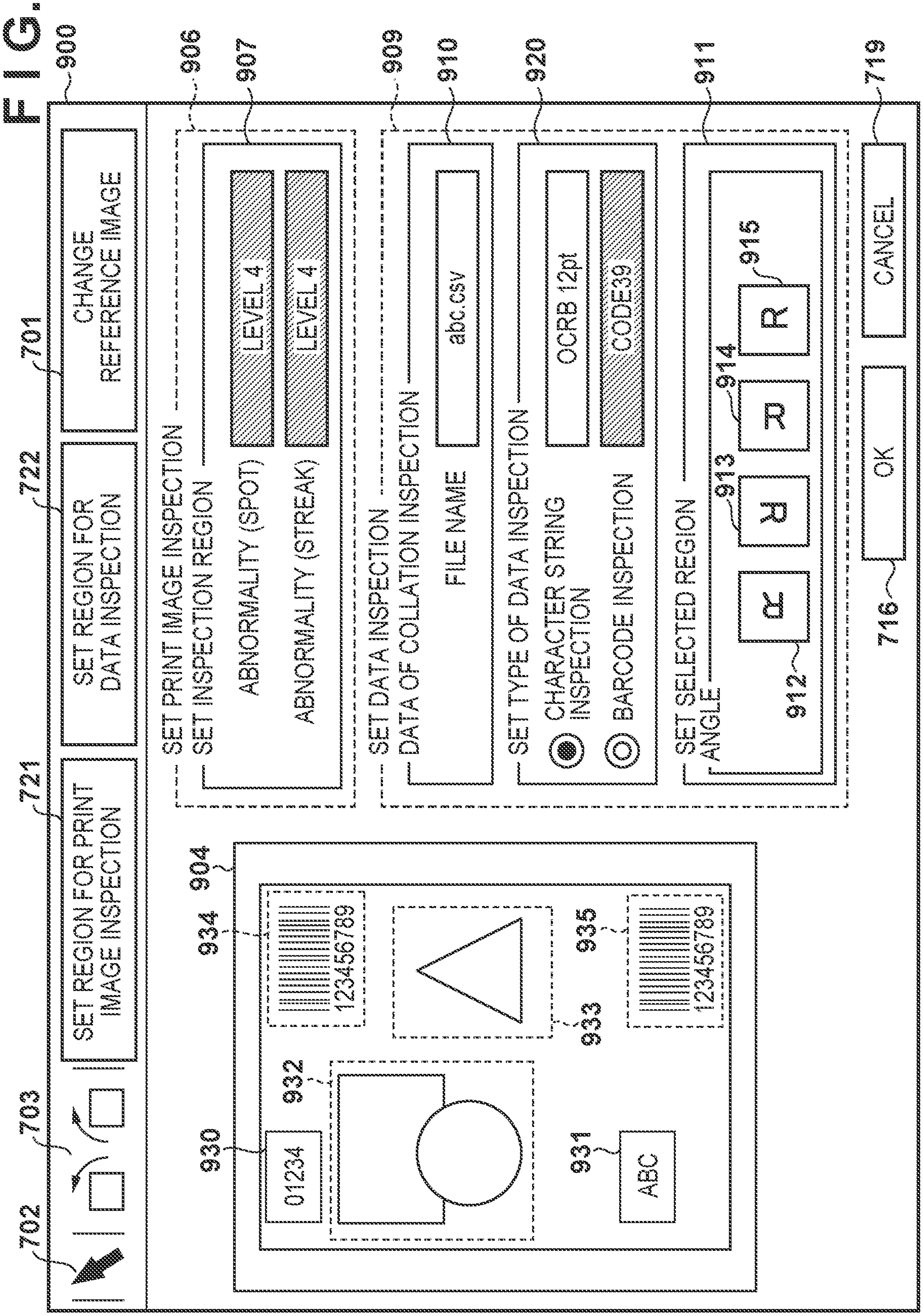
FIG. 9 is a view illustrating one example of a UI screen of inspection settings at the time of selection of inspection regions of the same inspection type according to an embodiment.

A UI screen 900 of FIG. 9 is a UI screen displayed on the UI unit 320 of the inspection apparatus 110 when items related to the inspection of step S403 are to be set. Regarding UIs similar to the UIs described with reference to FIG. 7, the same reference numerals are given, and description thereof is omitted. On the UI screen 900, all of the selected inspection regions are set for character string inspection. Here, a UI change when a character string inspection setting UI operation is enabled is described. In FIG. 9, data inspection regions 930 and 931 for inspecting a character string are simultaneously selected. An example is described in which in this case a setting UI related to character string inspection is enabled, and setting UIs related to the other inspection types (printed image inspection, barcode inspection) are disabled.

A table in which an association between enabling and disabling of each setting item for each inspection UI is defined in advance, as illustrated in FIG. 11, may be used in accordance with a selected inspection type. For example, in a case where character string inspection is selected for all the inspection regions, the UI is set in association with a corresponding ID such that setting of collation data, setting of the font, and setting of the angle are enabled, and setting of the abnormality detection level and setting of the type of the barcode are disabled.

UIs 906 and 907 of FIG. 9 are similar to the UIs 706 and 707 of FIG. 7, and are UIs for setting the level of abnormalities to be detected by the printed image inspection. In a case where the operation of the setting UI is disabled in step S603, each abnormality level setting is displayed as grayed out as in the UI 907, and operation by the user is disabled. A UI 910 of FIG. 9 is similar to the UI 710 of FIG. 7 and is a UI related to setting of a collation inspection data file used in data inspection. In order to enable a setting UI operation in step S603, an operation for setting a collation inspection data file is accepted from the user, as in the UI 910. A UI 920 of FIG. 9 is similar to the UI 720 of FIG. 7 and is a UI related to the setting of the type of character string inspection or barcode inspection. In a case where operation of the setting UI has been enabled in step S603, an operation for setting the type of character string inspection or barcode inspection is accepted from the user, as in the UI 920.

A UI 911 and buttons 912 to 915 of FIG. 9 are similar to the UI 711 of FIG. 7 and respectively are UIs regarding the setting of the direction in which character strings and barcodes are read and are the direction setting buttons 712 to 715 for setting the direction when a data inspection is performed. In a case where operation of the setting UI is enabled in step S607, setting operations on the direction setting buttons are accepted from the user, as with the buttons 912 to 915. When the CPU 302 enables in step S607 operation by the user for an inspection setting UI of the selected inspection type, the CPU 302 ends the processing of the flowchart of FIG. 6.

Although all UI setting changes related to inspection setting are disabled in the disabling processing of step S603 in the present embodiment, the present invention is not limited to the present embodiment, and configuration may be taken such that only specific settings are disabled. For example, configuration may be taken such that the UIs 706 and 707 for setting the abnormality level to be detected for the printed image inspection of FIG. 7 are not displayed to be grayed out and accept setting changes in a case where rather than changing the setting for each region, a common level setting is made for all regions. Similarly, configuration may be taken such that the UI 710 for setting collation data in FIG. 7 is not displayed as grayed out and accepts setting changes in a case where setting of the collation data is not changed for each region by rather is common to all regions. Disabling of settings related to other inspection, printed image inspection, and barcode inspection in a case where the character string inspection is selected has been described. Similarly, configuration may be taken such that, in the case where printed image inspection is selected, settings related to other inspection, that is character string inspection and barcode inspection, are disabled, and, in a case where barcode inspection is selected, the settings related to other inspection, that is printed image inspection and character string inspection, are disabled.

As described above, the inspection apparatus according to the present embodiment reads an image formed on a printed material to generate a reference image of an inspection target, and specifies each region including an object in the reference image, and displays the regions such that the regions are selectable. Also, the inspection apparatus batch-sets inspection conditions for a plurality of regions selected by the user via the displayed reference image. Further, the inspection apparatus disables setting of an inspection condition in a case where a plurality of regions selected by the user include different regions that include objects of different inspection types. On the other hand, in a case where a plurality of regions selected by the user do not include such different regions, the inspection apparatus enables setting of an inspection condition. Thus, when the user selects a plurality the same inspection type for printed image inspection or data inspection, it is possible to realize efficient settings by batch setting the setting information necessary for the inspection. On the other hand, in a case where regions having different inspection types are selected, conflicting settings can be restricted.

Second Embodiment

Hereinafter, a second embodiment of the present invention is described. In the above described first embodiment, a method has been described in which setting information necessary for inspection is batch-set in a case where a plurality of the same inspection type are selected by the user in the printed image inspection or the data inspection. In the present embodiment, an example of confirming whether or not when to perform a change when the batch setting is performed is described. Here, portions that differ from the above described first embodiment are mainly described. In the present embodiment, description is given for a case in which either of the regions of the data inspection regions 930 and 931 for inspecting a character string are selected in accordance with a user operation, and a UI as shown in FIG. 9 is displayed by the processing of step S607 in FIG. 6.

Figure 12:
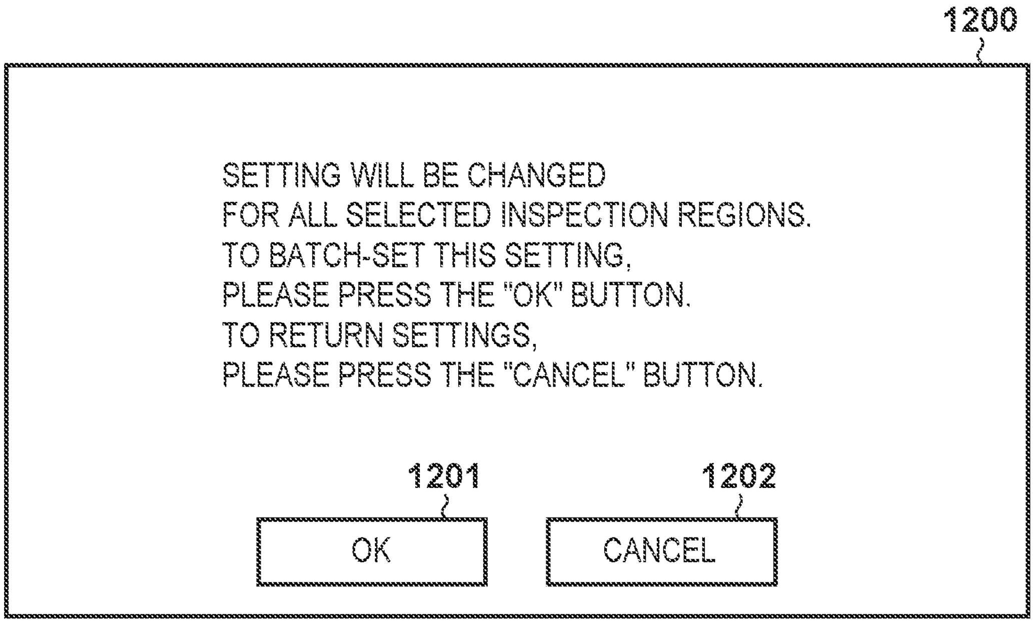
FIG. 12 is a view illustrating one example of a UI screen for confirming whether or not to perform a batch setting change according to an embodiment.

In the UI screen 900 of FIG. 9, in a case where all of the selected inspection regions are selected for the character string inspection, the setting of the collation data and the setting of the font can be changed. At this time, when a font that differs from the font set by the user is selected, a UI screen 1200 of FIG. 12 is displayed. The UI screen 1200 of FIG. 12 is a UI screen displayed on the UI unit 320 of the inspection apparatus 110 when a font that differs from the font that has been set is selected. The UI screen 1200 displays a message for confirming whether to change the batch set setting values.

A button 1201 is a button for storing changed values that have been batch-changed in the setting values of the corresponding inspection region. A button 1202 is a button for suspending the batch change, and when the button 1202 is pressed by the user, the information being batch-set is discarded, and the display of the setting values prior to the batch change is switched to. The present invention is not limited to the present embodiment, and any method may be used as long as it is a method of confirming whether or not a setting value that has been batch-set may be changed and determining whether or not there is a change in accordance with a result of the confirmation.

As described above, according to the present embodiment, when the inspection conditions for a plurality of regions selected by the user via the reference image are set in a batch, a confirmation to the user as to whether or not the setting is to be performed in a batch is made. Thus, when the user selects a plurality of the same inspection type in the printed image inspection or the data inspection, the user can confirm whether or not to perform a change when batch setting the setting information necessary for the inspection. As a result, it is possible to prevent an erroneous batch setting.

Third Embodiment

The third embodiment of the present invention is described below. In the above described first embodiment, a method has been described in which setting information necessary for inspection is batch-set in a case where a plurality of the same inspection type are selected by the user in printed image inspection or data inspection. In the present embodiment, description is given regarding an operation in a case where a setting UI corresponding to an inspection type of an inspection region selected by the user is enabled when a setting related to inspection is performed in the inspection settings of step S403 by the user. Here, portions that differ from the above described first embodiment are mainly described.

Figure 13:
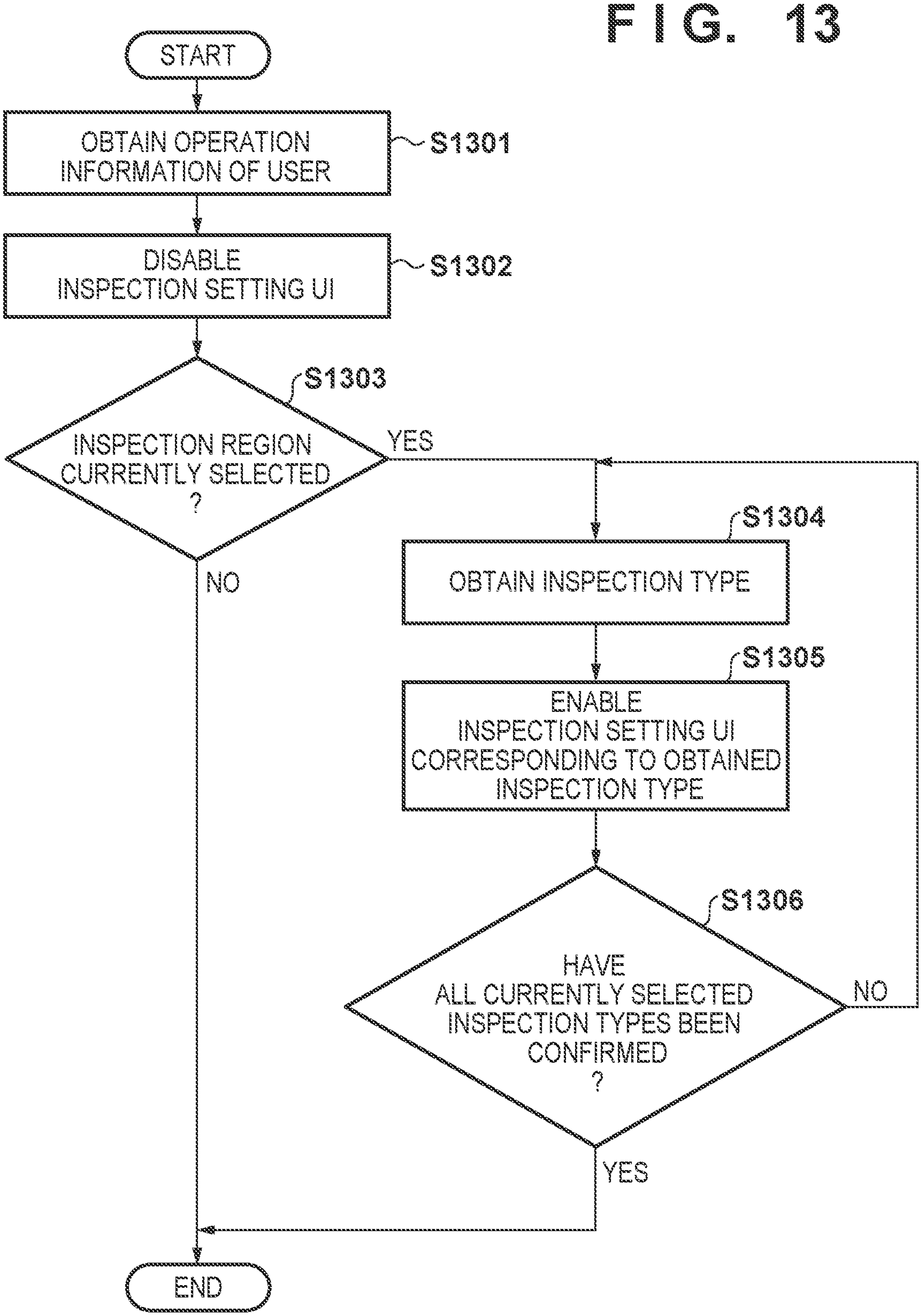
FIG. 13 is a flowchart of switching processing for enabling and disabling a UI setting according to an embodiment.

With reference to FIG. 13, in the present embodiment, a processing sequence of switching whether to enable or disable UI settings, which is invoked each time the user operates the screen when the user performs the inspection settings of step S403 is described. In the present embodiment, the setting UI corresponding to the inspection type of the inspection region selected by the user is enabled. The processing of the inspection apparatus 110 described below, is realized by the CPU 302 loading a program code stored in the ROM 304 into the RAM 303 and executing the loaded program.

First, in step S1301, the CPU 302 obtains information for operating the UI 700 in accordance with the inspection setting of the user. Subsequently, in step S1302, the CPU 302 performs processing for disabling the operation of the setting UI of each inspection. In this way, the processing of disabling operation of each setting UI is first executed, and then the corresponding setting UI is enabled according to the region selection of the user. Subsequently, in step S1303, the CPU 302 determines whether or not, for the operation information obtained in step S1301, one or more regions of the printed image inspection regions set in step S502 or the data inspection regions set in step S504 have been selected. In a case where the input is an input other than a selection of such regions, the processing of this flowchart is ended.

On the other hand, in a case where the input is an input of a selection of a corresponding region in step S1303, the CPU 302 obtains in step S1304 the inspection type of one inspection region among the regions selected in the operation information obtained in step S1301. Subsequently, in step S1305, the CPU 302 executes processing of enabling operation of the inspection setting UI corresponding to the inspection type obtained in step S1304. Specifically, the CPU 302 sets the UI according to a setting condition prepared in advance, as previously described above with reference to FIG. 11. For example, in a case where all of the selected inspection regions are selected for the character string inspection, the CPU 302 performs control so as to enable the setting of the collation data, the setting of the font, and the setting of the angle. Note, when an inspection type different from the inspection type confirmed previously in step S1304 is obtained, the processing of step S1305 for enabling the UI of that inspection type may be skipped and the processing may advance to step S1306. Alternatively, configuration may be taken such that all the setting UIs are disabled when different inspection types have been obtained. The user may be warned by a voice or display that regions of different inspection types have been selected in a case where the setting UIs are not disabled. Thus, enabling of the setting UI in a case where regions of different inspection types have been selected can be prevented, and similar advantages to those of the above described first embodiment can be achieved.

Next, in step S1306, the CPU 302 determines whether or not all of the currently selected inspection regions have been confirmed in step S1304. In a case where not all of the inspection regions selected have been confirmed, the CPU 302 returns the processing to step S1304 and repeats the processing until all inspection regions are confirmed. In a case where all the currently selected inspection regions are confirmed, the processing of this flowchart is ended.

As described above, the inspection apparatus according to the present embodiment reads an image formed on a printed material to generate a reference image of an inspection target, specifies regions including an object in the reference image, and displays the regions so as to be selectable. Also, the inspection apparatus sets in a batch inspection conditions for a plurality of regions selected by the user via the displayed reference image. Further, the inspection apparatus disables setting of all of the inspection conditions before a region is selected by the user, and when a region is selected by the user, the inspection apparatus enables setting of the inspection conditions corresponding to the inspection type according to the inspection type of the selected region. Accordingly, the setting UIs corresponding to the inspection type of the inspection region selected by the user can be enabled, and the remaining setting UIs remain disabled. Therefore, it is possible to dynamically enable the setting UIs in accordance with their own region selection, thereby providing a more user-friendly operation system for the user.

Fourth Embodiment

Hereinafter, a fourth embodiment of the present invention is described. In the above described first embodiment, a method has been described in which setting information necessary for inspection is batch-set in a case where a plurality of the same inspection types are selected in the printed image inspection or the data inspection set by the user. In the present embodiment, description is given regarding an operation of analyzing an attribute of a region of an image of an inspection region set by a user when the user performs a setting related to inspection in the inspection setting of step S403, and enabling a setting change of a UI for inspection setting in a case where all the attributes are the same attribute. Here, portions that differ from the above described first embodiment are mainly described.

Figure 14:
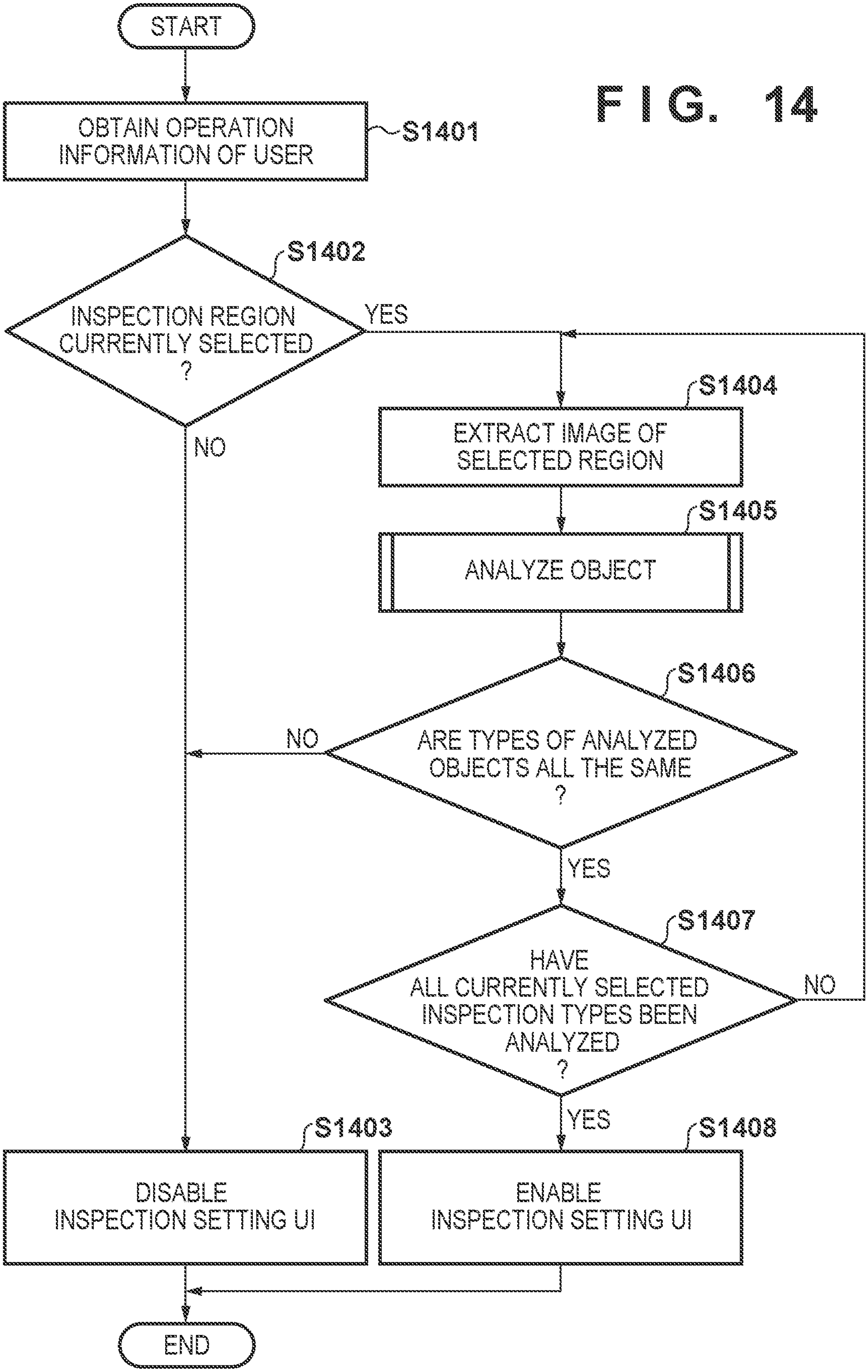
FIG. 14 is a flowchart of switching processing for enabling and disabling a UI setting according to an embodiment.

With reference to FIG. 14, in the present embodiment, a processing sequence of switching the enabling and disabling of UI settings, which is invoked each time the user operates the screen when the user performs the inspection setting of step S403, is described. In the embodiment, attributes of the region are analyzed in an image of an inspection region set by the user, and in a case where all the attributes are the same attribute, the setting UI corresponding to the analyzed attribute is enabled. The processing of the inspection apparatus 110 described below, is realized by the CPU 302 loading a program code stored in the ROM 304 into the RAM 303 and executing the loaded program.

First, in step S1401, the CPU 302 obtains information for operating the UI 700 in accordance with inspection settings of the user. Subsequently, in step S1402, the CPU 302 determines whether or not, for the operation information obtained in step S1401, one or more regions of the printed image inspection regions set in step S502 or the data inspection regions set in step S504 have been selected. In a case where the input is an input other than a corresponding region selection, the processing advances to step S1403, and the CPU 302 executes processing for disabling operation of setting UIs for each inspection, and ends the processing of this flowchart.

On the other hand, in a case where the operation is determined to be a region selection input in step S1402, the processing advances to step S1404, and the CPU 302 extracts an image of one inspection region among the regions selected in the operation information obtained in step S1401. Subsequently, in step S1405, the CPU 302 analyzes the image of the selected region extracted in step S1404, and determines the type of the object (photograph region/character region/barcode region). Note, details of an object analysis in the present embodiment are described later.

Subsequently, in step S1406, the CPU 302 determines whether the types of objects analyzed in step S1405 so far are all the same type. In a case where differing object types are included, the processing advances to step S1403, and the CPU 302 executes processing for disabling the operation of the setting UIs for each inspection, and ends the processing of this flowchart. On the other hand, if it is determined in step S14065 that all the object types are the same, the processing advances to step S1407, and the CPU 302 determines whether all of the inspection regions selected in step S1405 are analyzed. In a case where not all of the inspection regions selected have been analyzed, the processing is returned to step S1404 and repeats until all inspection regions are analyzed.

On the other hand, if all of the currently selected inspection regions have been analyzed, the processing advances to step S1408, and the CPU 302 executes processing for enabling the operation of the inspection setting UI corresponding to the selected same types of objects, and ends the processing of this flowchart. Note, in a case where the region is analyzed as a photograph region, the inspection type is treated as the printed image inspection, in a case where the region is analyzed as a character region, the inspection type is treated as a character string inspection, and in a case where the region is analyzed as a barcode region, the inspection type is treated as the barcode inspection.

<Object Analysis>

Figure 15:
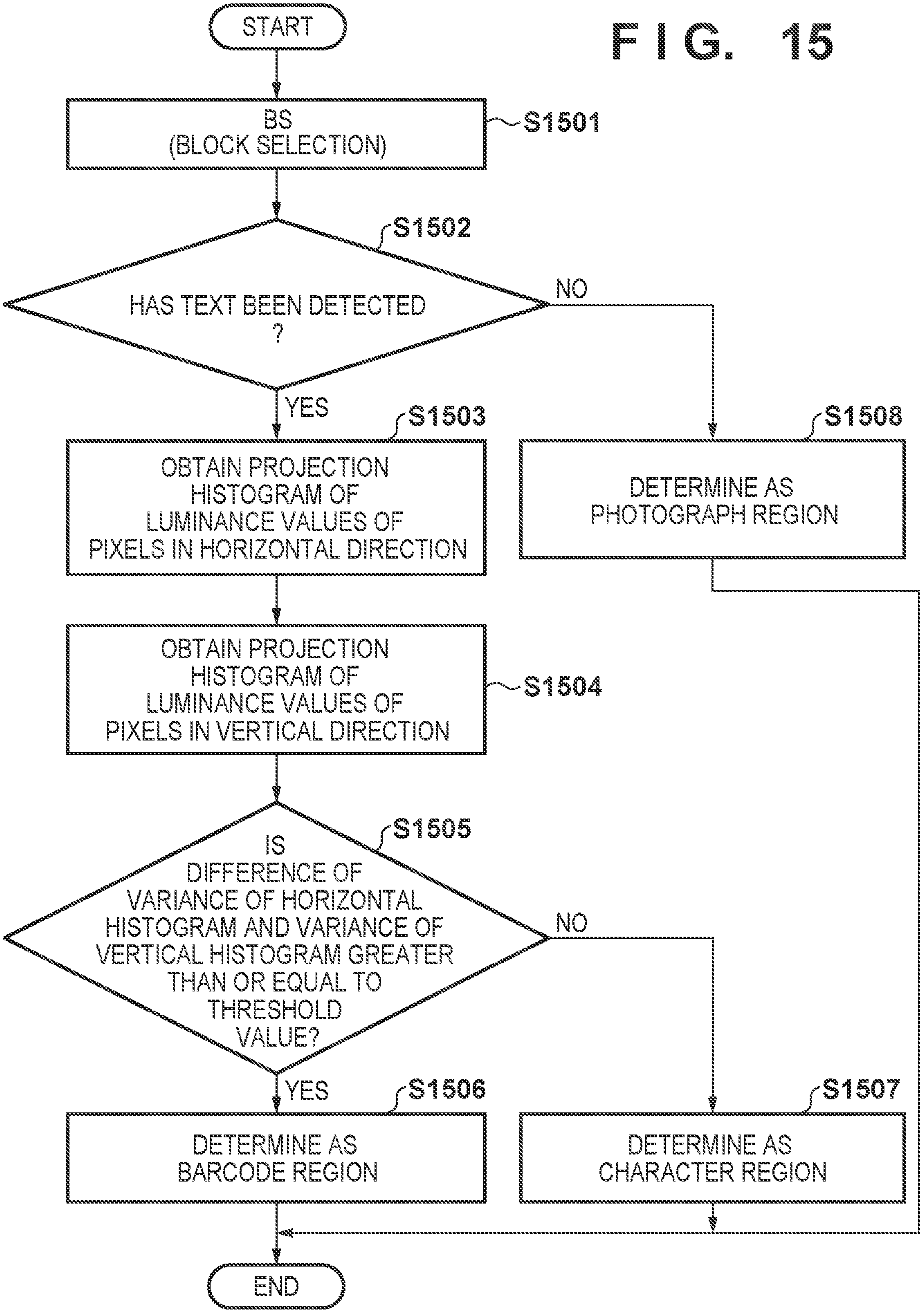
FIG. 15 is a flowchart of an object analysis of step S1405 according to an embodiment.

Next, with reference to FIG. 15, a processing sequence of analyzing an object of an image of an inspection region extracted in step S1405 and determining the type of the object (photograph region/character region/barcode region) is described. The processing of the inspection apparatus 110 described below, is realized by the CPU 302 loading a program code stored in the ROM 304 into the RAM 303 and executing the loaded program.

First, in step S1501, the CPU 302 executes block selection processing (hereinafter, referred to as BS processing) on the images of the selected region extracted in step S1404).

The BS processing is processing for dividing regions within images into object blocks and determining attributes of each block.

Figure 16B:
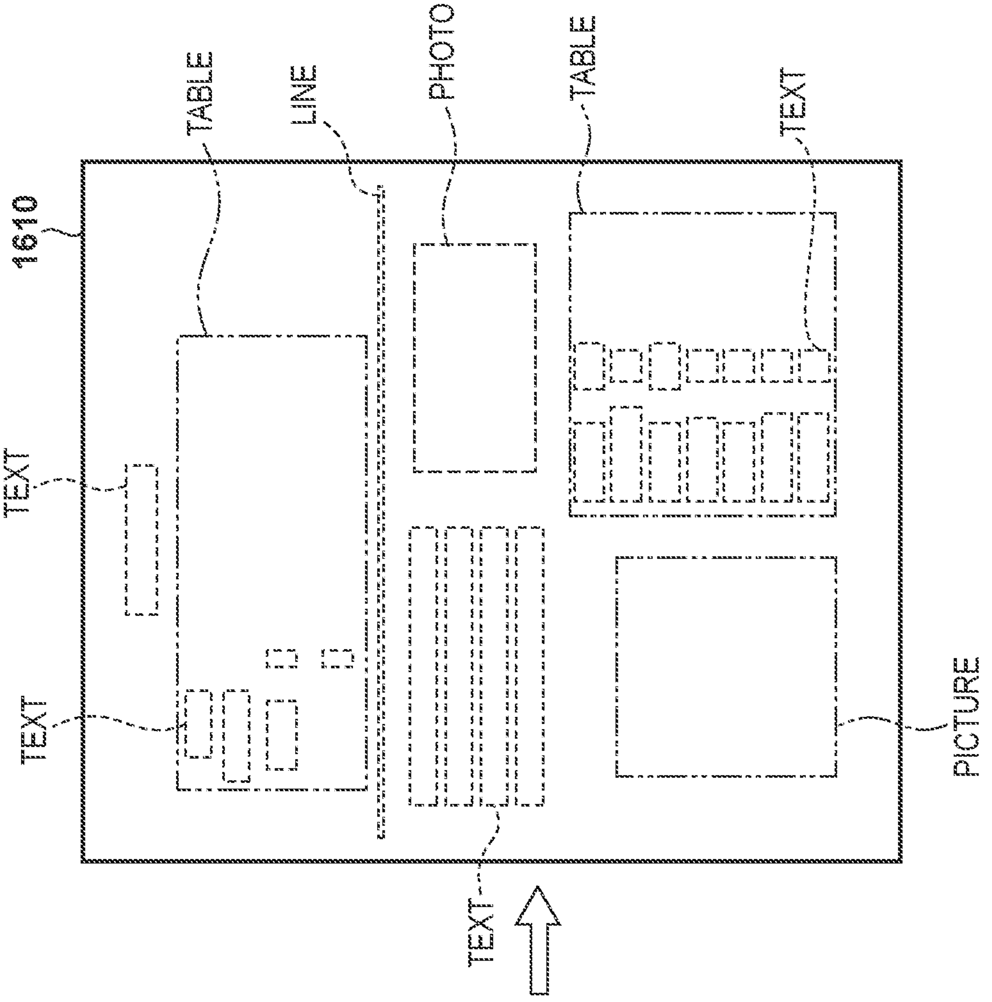
FIGS. 16A-16B are an example of block selection processing according to an embodiment.
Figure 16A:
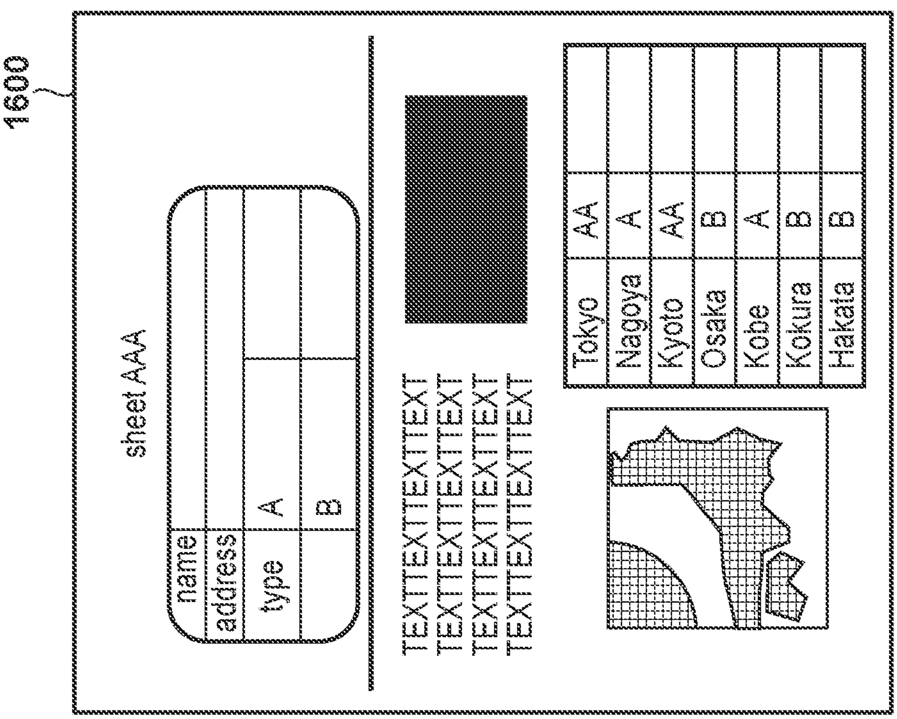

FIGS. 16A-16B illustrates a concrete example of the BS processing. Reference numeral 1600 denotes one example of a scanned image read in step S401. Reference numeral 1610 denotes a scanned image 1600 divided into object blocks. Reference numeral 1610 shows that attributes such as characters (TEXT), pictures (PICTURE), photographs (PHOTO), lines (LINE), and tables (TABLE) are determined for each of the blocks, and are divided into regions having different attributes.

Here, a detailed method of the block selection processing is described. First, the CPU 302 binarizes a scanned image into black and white. The CPU 302 then performs contour tracing to extract the shape of the contours from the binary images and extracts blocks of pixels surrounded by black pixel contours. The CPU 302 also performs contour tracing on white pixels in blocks of black pixels that have an area larger than a predetermined area, extracts blocks of white pixels, and then recursively extracts blocks of black pixels from the inside of the blocks of white pixels that are of the predetermined area or greater.

The CPU 302 classifies blocks of black pixels obtained in this way by size and shape, and classifies the blocks into regions having differing attributes. For example, a pixel block having an aspect ratio close to 1 and a size within a certain range is treated as a pixel block corresponding to a character. Further, a portion in which characters in close proximity can be grouped together with a good alignment is treated as a character region (TEXT). A flat pixel block is treated as a line region (LINE). A range occupied by black pixel blocks that are above a certain size and contain white pixel blocks that are square and have good alignment is treated as a table region (TABLE). A region in which irregularly shaped pixel blocks are scattered is treated as a photograph region (PHOTO). A pixel block of any other shapes is treated as a picture region (PICTURE). Note that since the BS processing in the present embodiment is performed on the images of the selected region extracted in step S1404, it is assumed that one region is determined. In a case where the BS processing is performed on the printed image inspection regions 732 and 733 shown in FIG. 7, a PICTURE attribute is determined, and the data inspection regions 730 and 731 for inspecting the character strings and the data inspection regions 734 and 735 for inspecting the barcodes are determined to be TEXT attributes.

The description of FIG. 15 is returned to here. Next, in step S1502, the CPU 302 confirms the attributes of the BS analyzed in step S1501, and confirms whether a TEXT attribute is detected. In a case where a TEXT attribute is not detected, the processing advances to step S1508, and the CPU 302 determines the selected region extracted in step S1404 as a photograph region, and ends the processing of this flowchart.

On the other hand, in step S1502, in a case where a TEXT attribute is detected, the processing advances to step S1503, and the CPU 302 obtains a projection histogram of luminance values of pixels in the horizontal direction with respect to the image of the TEXT attribute region analyzed in step S1501. In addition, in step S1504, the CPU 302 obtains a projection histogram of luminance values of pixels in the vertical direction. A method for obtaining a projection histogram according to the present embodiment is described later.

Next, in step S1505, the CPU 302 obtains a variance of the projection histogram in the horizontal direction and the projection histogram in the vertical direction obtained in step S1503 and in step S1504, and determines whether a difference between the variances obtained in each is equal to or larger than a threshold value. In a case where the difference in variances is equal to or greater than the threshold value, the processing advances to step S1506, and the CPU 302 determines the selected region extracted in step S1404 as a barcode region, and ends the processing of this flowchart. On the other hand, in a case where the difference in variances is less than the threshold value, the processing advances to step S1507, and the CPU 302 determines the selected region extracted in step S1404 as a character region, and ends the processing of this flowchart. A method for determining whether a region is a barcode region or a character region from the projection histogram of step S1504 according to the present embodiment is described later.

<Method for Determination of a TEXT Attribute>

Figure 17A:
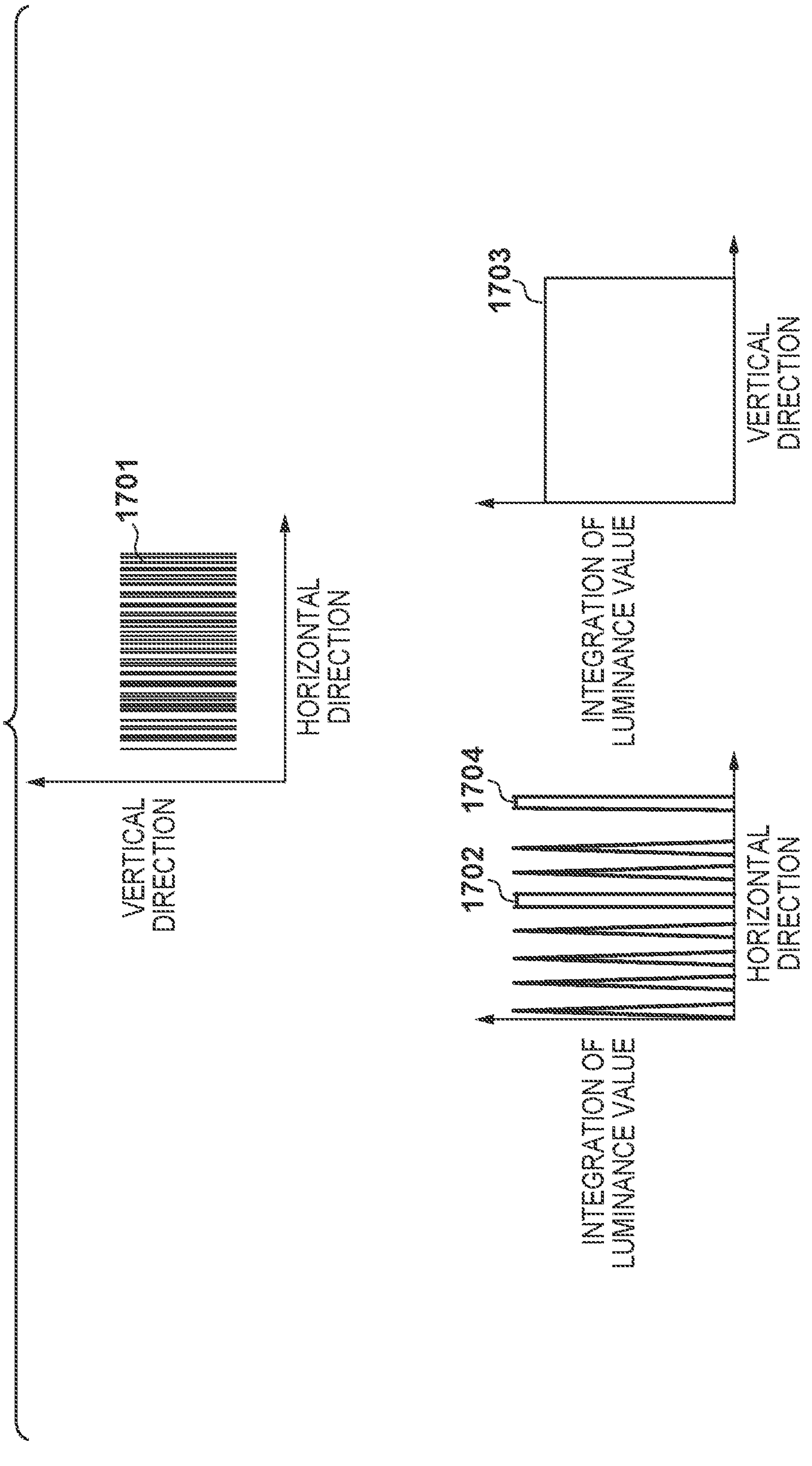
FIGS. 17A-17B are a view illustrating an example of character region discrimination based on projection histograms according to an embodiment.
Figure 17B:
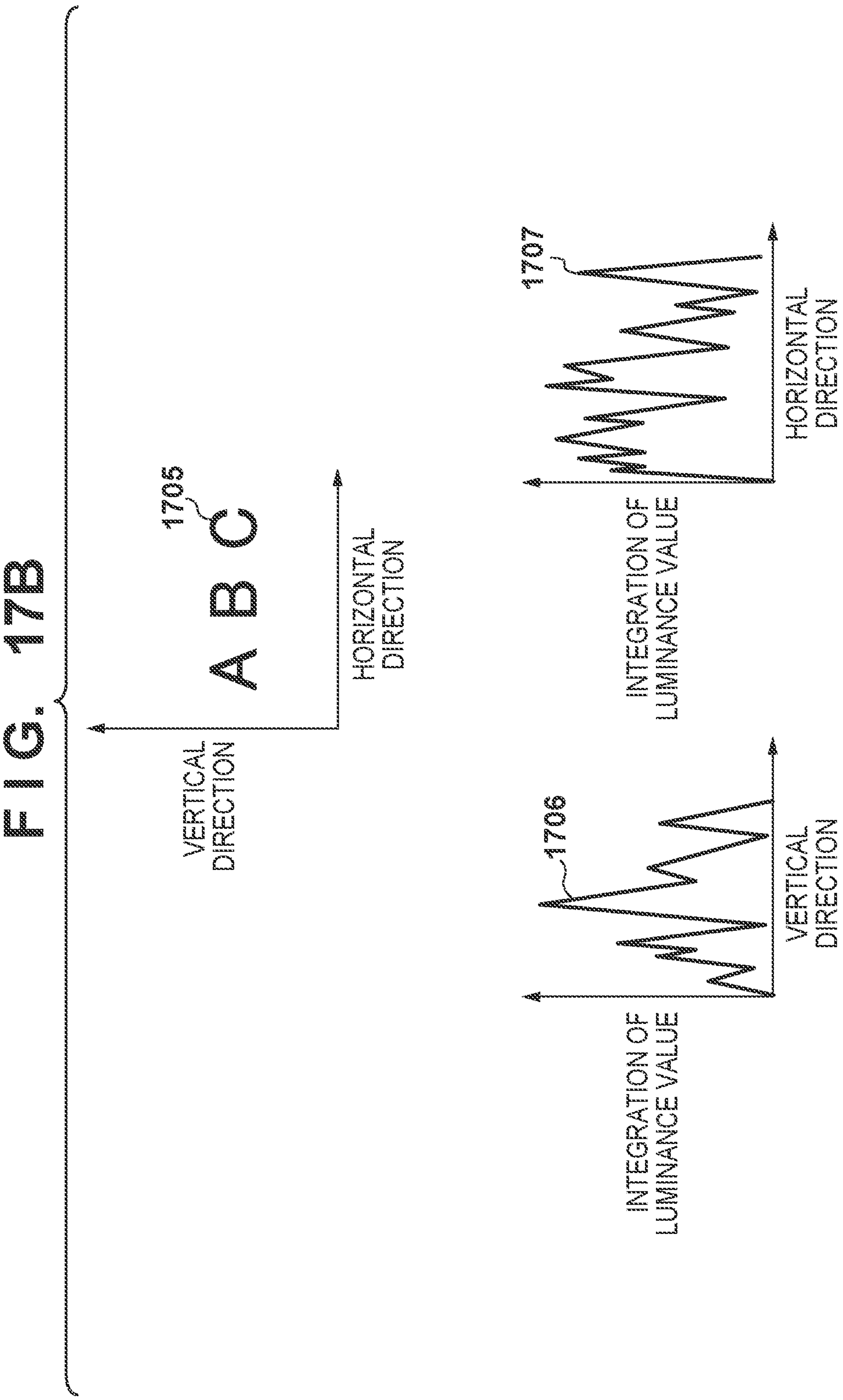

With reference to FIGS. 17A-17B, a method for obtaining a projection histogram with respect to the TEXT attribute and determining that the obtained projection histogram is a barcode region or a character region is described according to the present embodiment. FIG. 17A illustrates a method of determining a barcode region, and FIG. 17B illustrates a method of determining a character region.

In FIG. 17A, reference numeral 1701 denotes a group of pixels in the data inspection region 734 for inspecting a barcode. For this pixel group, a graph of the result of integrating the luminance values in the horizontal direction is denoted by reference numeral 1702, and a graph of the result of integrating the luminance values in the vertical direction is denoted by reference numeral 1703. The luminance values are obtained by using, for example, averages of each signal value of R, B, and G. In a case where reference numeral 1701 is, for example, a pixel group of 50 pixels in the vertical direction and 100 pixels in the horizontal direction, the integrated value of the luminance values of the pixel group in the rightmost column is as reference numeral 1704. When the luminance values of the pixel group of the rightmost column are all 255, the integrated value is 255×50=12750. Since the reference numeral 1701 is arranged in 100 pixels in the horizontal direction, 100 integrated values are obtained. Similarly, in the vertical direction, 50 integrated values are obtained.

Next, in the above described step S1505, the CPU 302 obtains the variances of the histograms in the horizontal direction and the vertical direction of each line drawing region, and determines whether or not the difference between the variance in the horizontal direction and the variance in the vertical direction is equal to or greater than a threshold value. In a case where the variance is equal to or larger than the threshold value, it is determined as a barcode region, and if that is not the case, it is determined as a character region. Regarding a method for obtaining the variance, in the present embodiment, from the average value of each integrated value in the vertical direction and the horizontal direction, a value obtained by dividing the sum of squares of the difference between each integrated value by the number of integrated values is used. However, the present invention is not limited thereto, and for example, configuration may be taken such that a standard deviation using a sum rather than a sum of squares is obtained and used.

Subsequently, the CPU 302 obtains an absolute value of the difference between the variance in the horizontal direction and the variance in the vertical direction obtained by the above-described method, and determines whether the value is equal to or greater than a threshold value. For example, since the variance in the horizontal direction of the pixel groups of the reference numeral 1701 is high, the value is 250. In addition, since the variance in the vertical direction is low, the value is 10. Since the threshold value depends on the magnitude of the luminance value, for example, the threshold value is normalized by dividing by a maximum possible value (255 in the present embodiment) of the luminance value of the reference image before the difference is obtained. Thus, the variance in the horizontal direction is 0.98 and the variance in the vertical direction is 0.04. Therefore, if the threshold value is 0.5, the difference of the above variance is 0.94 and exceeds the threshold value, so the CPU 302 determines that the region is a barcode region in the above described step S1506. Note, in the present embodiment, the determination is made according to the difference in variance, but the present invention is not limited to this, and for example, a difference in standard deviation may be used.

Meanwhile, reference numeral 1705 of FIG. 17B denotes a group of pixels in the data inspection region 731 for inspecting a character. In a case of a pixel group such as the reference numeral 1705, a graph of the result of integrating the luminance values in the horizontal direction is denoted by reference numeral 1706 and a graph of the result of integrating the luminance values in the vertical direction is denoted by reference numeral 1707. In the case of such a graph, both the horizontal direction and the vertical direction have a high variance. For example, the variance in the horizontal direction is a value such as 200 and the variance in the vertical direction is a value such as 170 in the pixel group of reference numeral 1705. When normalization is performed, the variance in the horizontal direction is 0.78 and the variance in the vertical direction is 0.67. In this case, since the difference is 0.11 and does not exceed the threshold value, the region is determined to be a character region in step S1507.

As described above, according to the present embodiment, in addition to the first embodiment, the inspection apparatus further extracts an image of a region selected by the user from the reference image and analyzes objects included in the extracted image. Further, the inspection apparatus controls setting of the inspection conditions to be enabled or disabled based on the inspection types of the analyzed objects. In this way, attributes of the region are analyzed in the image of the inspection region set by the user, and in a case where all the attributes are the same attribute, a setting change of UI for the inspection setting can be enabled.

According to the present invention, it is possible to efficiently perform setting related to inspection of a printed material.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-019774, filed Feb. 10, 2022, which is hereby incorporated by reference herein in its entirety.

What is claimed is:

1. An inspection apparatus comprising:

a display unit that specifies regions including an object in an inspection target reference image generated by reading an image formed on a printed material and selectably displaying each of the regions;

at least one memory device that stores a set of instructions; and at least one processor that executes the set of instructions to:

set in a batch inspection conditions for a plurality of regions selected by a user via the reference image displayed on the display unit, and disable batch setting of the inspection conditions that have been set in a case where the plurality of regions selected by the user include different regions including objects of different inspection types, and enable the batch setting of the inspection conditions that have been set in a case where the plurality of regions selected by the user do not include different regions.

2. The inspection apparatus according to claim 1, wherein the inspection types include at least a printed image inspection of a predetermined region and a data inspection of a predetermined region within the reference image.

3. The inspection apparatus according to claim 2, wherein the data inspection includes at least a character string inspection for inspecting a character string and a barcode inspection for inspecting a value of a barcode.

4. The inspection apparatus according to claim 3, wherein at least one of a setting of a level for detecting an abnormality in the printed image inspection, a setting of collation data for collating a value extracted in the data inspection, a setting of a type of the data inspection, and a setting of a direction of a region selected for the data inspection are included in the set inspection conditions.

5. The inspection apparatus according to claim 4, wherein at least one of a setting of a font for OCR processing in the character string inspection, and a setting of a type of a barcode in the barcode inspection are included in the setting of the type of the data inspection.

6. The inspection apparatus according to claim 2, wherein the at least one processor executes instructions in the memory device to:

disable setting for all of the inspection conditions in a case where a region in which the printed image inspection is to be performed and a region in which the data inspection is to be performed are included in the plurality of regions.

7. The inspection apparatus according to claim 1, wherein the at least one processor executes instructions in the memory device to:

in a case where regions of the same inspection type are included in the plurality of regions, enable setting of the inspection conditions relating to the inspection type and disable setting of the inspection conditions relating to other inspection types.

8. The inspection apparatus according to claim 7, further comprising:

a storage unit that stores, in accordance with the inspection type, a table in which information for switching enabling and disabling of each setting item of the inspection conditions is defined, wherein the at least one processor executes instructions in the memory device to:

switch enabling and disabling of each setting item of the inspection conditions according to the table stored in the storage unit.

9. The inspection apparatus according to claim 1, wherein the at least one processor executes instructions in the memory device to:

disable setting of the inspection conditions by controlling such that a setting item is displayed as grayed out and cannot be selected.

10. The inspection apparatus according to claim 1, further comprising:

an inspection unit that performs an inspection by using the read inspection target printed material inspection image, the set inspection conditions, and the reference image.

11. The inspection apparatus according to claim 1, wherein the at least one processor executes instructions in the memory device to:

in a case where setting in a batch the inspection conditions for the plurality of regions selected by the user via the reference image, make a confirmation to the user as to whether or not to perform setting in a batch.

12. The inspection apparatus according to claim 1, wherein the at least one processor executes instructions in the memory device to:

extract from the reference image an image of a region selected by a user, analyze an object included in the extracted image, and control enabling or disabling of setting of the inspection conditions based on an inspection type of the analyzed object.

13. The inspection apparatus according to claim 12, wherein the at least one processor executes instructions in the memory device to:

obtain projection histograms for luminance values of pixels of a horizontal direction and a vertical direction, respectively, of the extracted image and analyze whether that extracted image is a photograph region, a character region, or a barcode region according to a difference in a variance of the projection histograms.

14. An inspection apparatus comprising:

a display unit that specifies regions including an object in an inspection target reference image generated by reading an image formed on a printed material and selectably displaying each of the regions;

at least one memory device that stores a set of instructions; and at least one processor that executes the set of instructions to set in a batch inspection conditions for a plurality of regions selected by a user via the reference image displayed on the display unit, and disable setting of all of the inspection conditions before a region is selected by the user, and when a region is selected by the user, enable setting of the inspection conditions corresponding to an inspection type of the selected region.

15. The inspection apparatus according to claim 14, wherein the at least one processor executes instructions in the memory device to:

in a case where a region corresponding to an inspection type different from an inspection type for which setting of inspection conditions has previously been enabled is selected by the user, disable the previously enabled setting of inspection conditions or output a corresponding warning to the user.

16. A method for controlling an inspection apparatus comprising:

specifying regions including an object in an inspection target reference image generated by reading an image formed on a printed material and selectably displaying each of the regions;

setting in a batch inspection conditions for a plurality of regions selected by a user via the displayed reference image, and disabling batch setting of the inspection conditions that have been set in a case where the plurality of regions selected by the user include different regions including objects of different inspection types and enabling batch setting of the inspection conditions that have been set in a case where the plurality of regions selected by the user do not include different regions.

17. A method for controlling an inspection apparatus comprising:

specifying regions including an object in an inspection target reference image generated by reading an image formed on a printed material and selectably displaying each of the regions;

setting in a batch inspection conditions for a plurality of regions selected by a user via the displayed reference image, and disable setting of all of the inspection conditions before a region is selected by the user, and when a region is selected by the user, enable setting of the inspection conditions corresponding to an inspection type of the selected region.

18. A non-transitory computer-readable storage medium storing a computing program for causing a computer to execute each process in a method for controlling an inspection apparatus, the control method comprising:

specifying regions including an object in an inspection target reference image generated by reading an image formed on a printed material and selectably displaying each of the regions;

setting in a batch inspection conditions for a plurality of regions selected by a user via the displayed reference image, and disabling batch setting of the inspection conditions that have been set in a case where the plurality of regions selected by the user include different regions including objects of different inspection types and enabling batch setting of the inspection conditions that have been set in a case where the plurality of regions selected by the user do not include different regions.

19. A non-transitory computer-readable storage medium storing a computing program for causing a computer to execute each process in a method for controlling an inspection apparatus, the control method comprising:

specifying regions including an object in an inspection target reference image generated by reading an image formed on a printed material and selectably displaying each of the regions;

setting in a batch inspection conditions for a plurality of regions selected by a user via the displayed reference image, and disable setting of all of the inspection conditions before a region is selected by the user, and when a region is selected by the user, enable setting of the inspection conditions corresponding to an inspection type of the selected region.

20. An inspection apparatus comprising:

a display unit that specifies regions including an object in an inspection target reference image generated by reading an image formed on a printed material and selectably displaying each of the regions;

at least one memory device that stores a set of instructions; and at least one processor that executes the set of instructions to, in a case where different regions including objects of different inspection types are not included in a plurality of regions selected by a user via the reference image displayed on the display unit, enable a batch setting of inspection conditions for the plurality of regions.

* * * * *